(12) United States Patent
Hammons, Jr. et al.

(10) Patent No.: US 6,678,263 B1
(45) Date of Patent: Jan. 13, 2004

(54) METHOD AND CONSTRUCTIONS FOR SPACE-TIME CODES FOR PSK CONSTELLATIONS FOR SPATIAL DIVERSITY IN MULTIPLE-ELEMENT ANTENNA SYSTEMS

(75) Inventors: A. Roger Hammons, Jr., North Potomac, MD (US); Hesham El Gamal, Laurel, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/397,896

(22) Filed: Sep. 17, 1999

Related U.S. Application Data

(60) Provisional application No. 60/101,029, filed on Sep. 18, 1998, and provisional application No. 60/144,559, filed on Jul. 16, 1999.

(51) Int. Cl.[7] .............................................. H04B 7/216
(52) U.S. Cl. ...................... 370/342; 370/335; 375/299; 375/267
(58) Field of Search .......................... 370/310.1, 310.2, 370/319–321, 335, 336, 337, 342, 347, 905; 375/146, 147, 240.23, 240.24, 240.25, 240.27, 267, 265, 261, 272, 279, 281, 282, 283, 298, 299

(56) References Cited

U.S. PATENT DOCUMENTS

| | | | | |
|---|---|---|---|---|
| 4,660,214 A | * | 4/1987 | Pahlavan et al. | ............ 375/262 |
| 5,541,955 A | * | 7/1996 | Jacobsmeyer | ................. 375/222 |
| 5,886,989 A | * | 3/1999 | Evans et al. | .................. 370/347 |
| 6,246,698 B1 | * | 6/2001 | Kumar | .......................... 370/487 |
| 6,356,555 B1 | * | 3/2002 | Rakib et al. | ................... 370/441 |
| 6,370,129 B1 | * | 4/2002 | Huang | .......................... 370/329 |
| 6,473,467 B1 | * | 10/2002 | Wallace et al. | ............... 375/267 |

OTHER PUBLICATIONS

"Space–Time Block Coding for Wireless Communications: Theory of Generalized Orthogonal Designs,", V. Tarokh, et al, (pp. 1–30).

"On Limits of Wireless Communications in a Fading Environment when Using Multiple Antennas", G. J. Foschini, et al, pp. 311–335, Wireless Personal Communications, 1998.

"Two Signaling Schemes for Improving the Error Performance of Frequency Division Duplex (FDD) Transmission Systems Using Transmitter Antenna Diversity" N. Seshadri, et al, pp. 49–60, International Journal of Wireless Information Networks, vol. 1, No. 1, 1994.

(List continued on next page.)

*Primary Examiner*—Vivian Chin
*Assistant Examiner*—Charles Craver
(74) *Attorney, Agent, or Firm*—John T. Whelan; Michael Sales

(57) ABSTRACT

General binary design criteria for PSK-modulated space-time codes are provided. For linear binary PSK (BPSK) codes and quadrature PSK (QPSK) codes, the rank (i.e., binary projections) of the unmodulated code words, as binary matrices over the binary field, is used as a design criterion. Fundamental code constructions for both quasi-static and time-varying channels are provided.

22 Claims, 5 Drawing Sheets

OTHER PUBLICATIONS

"Signal Design for Transmitter Diversity Wireless Communication Systems Over Rayleigh Fading Channels", Jiann–Ching Guey, et al, pp. 1–23, Jan. 29, 1998.

"Improved Codes for Space–Time Trellis Coded Modulation", S. Baro, et al, pp. 1–3.

"Space–Time Codes for High Data Rate Wireless Communication: Performance Criterion and Code Construction", V. Tarokh, et al, IEEE Transactions on Information Theory, vol. 44, No. 2, Mar. 1998, pp. 744–765.

"Further Results on Space–Time Coding for Rayleigh Fading", J. Grimm, et al, presented at Allerton Conference, Sep. 1998, pp. 1–10.

"A Simple Transmit Diversity Technique for Wireless Communications", S. Alamouti, IEEE Journal on Select Areas in Communications, vol. 16, No. 8, Oct. 1998, pp. 1451–1458.

"Space–Time Coded Modulation for High Data Rate Wireless Communications", Naguib A. F., et al., Global Telecommunications Conference (GLOBECOM), Nov. 3, 1997 pp. 102–109).

* cited by examiner

METHOD AND CONSTRUCTIONS FOR SPACE-TIME CODES FOR PSK CONSTELLATIONS FOR SPATIAL DIVERSITY IN MULTIPLE-ELEMENT ANTENNA SYSTEMS

This application claims priority to U.S. Provisional patent application Serial No. 60/101,029, filed Sep. 18, 1998 for "Method and Constructions for Space-Time Codes for PSK Constellations", and U.S. Provisional patent application Serial No. 60/144,559, filed Jul. 16, 1999 for "Method and Constructions for Space-Time Codes for PSK Constellations II", both of which were filed by A. Roger Hammons, Jr. and Hesham El Gamal.

FIELD OF THE INVENTION

The invention relates generally to PSK-modulated space-time codes and more specifically to using fundamental code constructions for quasi-static and time-varying channels to provide full spatial diversity for an arbitrary number of transmit antennas.

BACKGROUND OF THE INVENTION

Recent advances in coding theory include space-time codes which provide diversity in multi-antenna systems over fading channels with channel coding across a small number of transmit antennas. For wireless communication systems, a number of challenges arise from the harsh RF propagation environment characterized by channel fading and co-channel interference (CCI). Channel fading can be attributed to diffuse and specular multipath, while CCI arises from reuse of radio resources. Interleaved coded modulation on the transmit side of the system and multiple antennas on the receive side are standard methods used in wireless communication systems to combat time-varying fading and to mitigate interference. Both are examples of diversity techniques.

Simple transmit diversity schemes (in which, for example, a delayed replica of the transmitted signal is retransmitted through a second, spatially-independent antenna and the two signals are coherently combined at the receiver by a channel equalizer) have also been considered within the wireless communications industry as a method to combat multipath fading. From a coding perspective, such transmit diversity schemes amount to repetition codes and encourage consideration of more sophisticated code designs. Information-theoretic studies have demonstrated that the capacity of multi-antenna systems significantly exceeds that of conventional single-antenna systems for fading channels. The challenge of designing channel codes for high capacity multi-antenna systems has led to the development of "space-time codes," in which coding is performed across the spatial dimension (e.g, antenna channels) as well as time. The existing body of work on space-time codes relates to trellis codes and a block coded modulation scheme based on orthogonal designs. Example code designs that achieve full diversity for systems with only a small number of antennas (L=2 and 3) are known for both structures, with only a relatively small number of space-time codes being known. Thus, a need exists for a methodology of generating and using code constructions which allow systematic development of powerful space-time codes such as general constructions that provide full diversity in wireless systems with a large number of antennas.

The main concepts of space-time coding for quasi-static, flat Rayleigh fading channels and the prior knowledge as to how to design them will now be discussed. For the purpose of discussion, a source generates k information symbols from the discrete alphabet X, which are encoded by the error control code C to produce code words of length $N=nL_t$ over the symbol alphabet Y. The encoded symbols are parsed among $L_t$ transmit antennas and then mapped by the modulator into constellation points from the discrete complex-valued signaling constellation $\Omega$ for transmission across a channel. The modulated streams for all antennas are transmitted simultaneously. At the receiver, there are $L_r$ receive antennas to collect the incoming transmissions. The received baseband signals are subsequently decoded by the space-time decoder. Each spatial channel (the link between one transmit antenna and one receive antenna) is assumed to experience statistically independent flat Rayleigh fading. Receiver noise is assumed to be additive white Gaussian noise (AWGN). A space-time code consists as discussed herein preferably of an underlying error control code together with the spatial parsing format.

Definition 1 An L×n space-time code $\mathcal{C}$ of size M consists of an (Ln,M) error control code C and a spatial parser a that maps each code word vector $\bar{c} \in C$ to an L×n matrix c whose entries are a rearrangement of those of $\bar{c}$. The space-time code $\mathcal{C}$ is said to be linear if both C and σ are linear.

Except as noted to the contrary, a standard parser is assumed which maps $$\bar{c}=(c_1^1, c_1^2, \ldots, c_1^{L_t}, c_2^1, c_2^2, \ldots, c_2^{L_t}, \ldots, c_n^1, c_n^2, \ldots, c_n^{L_t}) \in C$$

to the matrix $$c = \begin{bmatrix} c_1^1 & c_2^1 & \cdots & c_n^1 \\ c_1^2 & c_2^2 & \cdots & c_n^2 \\ \vdots & \vdots & \ddots & \vdots \\ c_1^{L_t} & c_2^{L_t} & \cdots & c_n^{L_t} \end{bmatrix}.$$

In this notation, it is understood that $c_t^i$ is the code symbol assigned to transmit antenna i at time t.

Let $f:y \to \Omega$ be the modulator mapping function. Then s=f(c) is the baseband version of the code word as transmitted across the channel. For this system, the following baseband model of the received signal is presented:

$$y_t^j = \sum_{i=1}^{L_t} \alpha_{ij} s_t^i \sqrt{E_s} + n_t^j, \tag{1}$$

where $y_t^j$ is the signal received at antenna j at time t; $\alpha_{ij}$ is the complex path gain from transmit antenna i to receive antenna j; $s_t^i=f(c_t^i)$ is the transmitted constellation point corresponding to $c_t^i$; and $n_t^j$ is the AWGN noise sample for receive antenna j at time t. The noise samples are independent samples of a zero-mean complex Gaussian random variable with variance $N_0/2$ per dimension. The fading channel is quasi-static in the sense that, during the transmission of n code word symbols across any one of the links, the complex path gains do not change with time t, but are independent from one code word transmission to the next. In matrix notation, $$\bar{Y}=\sqrt{E_s}AD_c+\bar{N}, \tag{2}$$

where $$\overline{Y} = [y_1^1 \ y_2^1 \ \ldots \ y_n^1 \ y_1^2 \ y_2^2 \ \ldots \ y_n^2 \ \ldots \ y_1^{L_r} \ y_2^{L_r} \ \ldots \ y_n^{L_r}],$$

$$\overline{N} = [n_1^1 \ n_2^1 \ \ldots \ n_n^1 \ n_1^2 \ n_2^2 \ \ldots \ n_n^2 \ \ldots \ n_1^{L_r} \ n_2^{L_r} \ \ldots \ n_n^{L_r}],$$

$$\overline{A} = [\alpha_{11} \ \alpha_{21} \ \ldots \ \alpha_{L_t 1} \ \alpha_{12} \ \alpha_{22} \ \ldots \ \alpha_{L_t 2} \ \ldots \ \alpha_{1 L_r} \ \alpha_{2 L_r} \ \ldots \ \alpha_{L_t L_r}],$$

$$D_c = \begin{bmatrix} f(c) & 0 & \ldots & 0 \\ 0 & f(c) & \ldots & 0 \\ \vdots & \ddots & \ddots & 0 \\ 0 & 0 & \ldots & f(c) \end{bmatrix}_{L_r L_t \times L_r n}.$$

Let code word c be transmitted. Then the pairwise error probability that the decoder prefers the alternate code word e to c is given by $$P(c \to e | \{\alpha_{ij}\}) = P(V < 0 | \{\alpha_{ij}\}),$$

where $V = \|\overline{A}(D_c - D_e) + \overline{N}\|^2 - \|\overline{N}\|^2$ is a Gaussian random variable with mean $E\{V\} = \|\overline{A}(D_c - D_e)\|^2$ and variance $Var\{V\} = 2N_0 E\{V\}$. Thus, $$P(V < 0 | \{\alpha_{ij}\}) = Q\left(\frac{\|\overline{A}(D_c - D_e)\|}{\sqrt{2N_0}}\right) \quad (3)$$

$$\leq \frac{1}{2}\exp\left\{-\frac{1}{4N_0}\|\overline{A}(D_c - D_e)\|^2\right\}. \quad (4)$$

For the quasi-static, flat Rayleigh fading channel, equation (4) can be manipulated to yield the fundamental bound:

$$P(c \to e | \{\alpha_{ij}\}) \leq \left(\frac{1}{\prod_{i=1}^{r}(1 + \lambda_i E_s / 4N_0)}\right)^{L_r} \quad (5)$$

$$\leq \left(\frac{\eta E_s}{4N_0}\right)^{-rL_r}, \quad (6)$$

where $r = \text{rank}(f(c) - f(e))$ and $\eta = (\lambda_1 \lambda_2 \ldots \lambda_r)^{1/r}$ is the geometric mean of the nonzero eigenvalues of $A = (f(c) - f(e))(f(c) - f(e))^H$.

This leads to the rank and equivalent product distance criteria for space-time codes.

(1) Rank Criterion: Maximize the diversity advantage $r = \text{rank}(f(c) - f(e))$ over all pairs of distinct code words c, e $\in \mathcal{C}$, and (2) Product Distance Criterion: Maximize the coding advantage $\eta = (\lambda_1 \lambda_2 \ldots \lambda_r)^{1/r}$ over all pairs of distinct code words c, e $\in \mathcal{C}$.

The rank criterion is the more important of the two criteria as it determines the asymptotic slope of the performance curve as a function of $E_s/N_0$. The product distance criterion is preferably of secondary importance and is ideally optimized after the diversity advantage is maximized. For an L×n space-time code $\mathcal{C}$, the maximum possible rank is L. Consequently, full spatial diversity is achieved if all baseband difference matrices corresponding to distinct code words in $\mathcal{C}$ have full rank L.

Simple design rules for space-time trellis codes have been proposed for L=2 spatial diversity as follows:

Rule 1. Transitions departing from the same state differ only in the second symbol.

Rule 2. Transitions merging at the same state differ only in the first symbol. When these rules are followed, the code word difference matrices are of the form $$f(c) - f(e) = \begin{bmatrix} \ldots & x_1 & 0 & \ldots \\ \ldots & 0 & x_2 & \ldots \end{bmatrix}$$

with $x_1$, $x_2$ nonzero complex numbers. Thus, every such difference matrix has full rank, and the space-time code achieves 2-level spatial diversity. Two good codes that satisfy these design rules, and a few others that do not, have been handcrafted using computer search methods.

The concept of "zeroes symmetry" has been introduced as a generalization of the above-referenced design rules for higher levels of diversity $L \geq 2$. A space-time code has zeroes symmetry if every baseband code word difference $f(c) - f(e)$ is upper and lower triangular (and has appropriate nonzero entries to ensure full rank). The zeroes symmetry property is sufficient for full rank but not necessary; nonetheless, it is useful in constraining computer searches for good space-time codes.

Results of a computer search undertaken to identify full diversity space-time codes with best possible coding advantage have been presented. A small table of short constraint length space-time trellis codes that achieve full spatial diversity (L=2, 3, and 5 for BPSK modulation; L=2 for QPSK modulation) is available. Difficulties, however, are encountered when evaluating diversity and coding advantages for general space-time trellis codes. As a general space-time code construction, delay diversity schemes are known to achieve full diversity for all $L \geq 2$ with the fewest possible number of states.

A computer search similar to the above-referenced computer search has identified optimal L=2 QPSK space-time trellis codes of short constraint length. The results agree with the previous results regarding the optimal product distances but the given codes have different generators, indicating that, at least for L=2, there is a multiplicity of optimal codes.

A simple transmitter diversity scheme for two antennas has been introduced which provides 2-level diversity gain with modest decoder complexity. In this scheme, independent signalling constellation points $x_1$, $x_2$ are transmitted simultaneously by different transmit antennas during a given symbol interval. On the next symbol interval, the conjugated signals $-x_2^*$ and $x_1^*$ are transmitted by the respective antennas. This scheme has the property that the two transmissions are orthogonal in both time and the spatial dimension.

The Hurwitz-Radon theory of real and complex orthogonal designs are a known generalization this scheme to multiple transmit antennas. Orthogonal designs, however, are not space-time codes as defined herein since, depending on the constellation, the complex conjugate operation that is essential to these designs may not have a discrete algebraic interpretation. The complex generalized designs for L=3 and 4 antennas also involve division by √2.

To summarize, studies on the problem of signal design for transmit diversity systems have led to the development of the fundamental performance parameters for space-time codes over quasi-static fading channels such as: (1) diversity advantage, which describes the exponential decrease of decoded error rate versus signal-to-noise ratio (asymptotic slope of the performance curve on a log-log scale); and (2) coding advantage, which does not affect the asymptotic slope but results in a shift of the performance curve. These parameters are, respectively, the minimum rank and minimum geometric mean of the nonzero eigenvalues among a set of complex-valued matrices associated with the differences between baseband modulated code words. A small number of interesting, handcrafted trellis codes for two antenna systems have been presented which provide maximum 2-level diversity advantage and good coding advantage.

One of the fundamental difficulties of space-time codes, which has so far hindered the development of more general results, is the fact that the diversity and coding advantage design criteria apply to the complex domain of baseband modulated signals, rather than to the binary or discrete domain in which the underlying codes are traditionally designed. Thus, a need also exists for binary rank criteria for generating BPSK and QPSK-modulated space-time codes.

SUMMARY OF THE INVENTION

The present invention overcomes the disadvantages of known trellis codes generated via design rules having very simple structure. In accordance with the present invention, more sophisticated codes are provided using a method involving design rules selected in accordance with the preferred embodiment of the present invention. These codes are straightforward to design and provide better performance than the known codes. The present invention also provides a significant advance in the theory of space-time codes, as it provides a code design method involving a powerful set of design rules in the binary domain. Current design criteria are in the complex baseband domain, and the best code design rules to date are ad hoc with limited applicability.

The present invention further provides a systematic method, other than the simple delay diversity, of designing space-time codes to achieve full diversity for arbitrary numbers of antennas. The performance of space-time codes designed in accordance with the methodology and construction of the present invention exceed that of other known designs.

Briefly summarized, the present invention relates to the design of space-time codes to achieve full spatial diversity over fading channels. A general binary design criteria for phase shift keying or PSK-modulated space-time codes is presented. For linear binary PSK (BPSK) codes and quadrature PSK (QPSK) codes, the rank (i.e., binary projections) of the unmodulated code words, as binary matrices over the binary field, is a design criterion. Fundamental code constructions for both quasi-static and time-varying channels are provided in accordance with the present invention.

A communication method in accordance with an embodiment of the present invention comprises the steps of generating information symbols for data block frames of fixed length, encoding the generated information symbols with an underlying error control code to produce the code word symbols, parsing the produced code word symbols to allocate the symbols in a presentation order to a plurality of antenna links, mapping the parsed code word symbols onto constellation points from a discrete complex-valued signaling constellation, transmitting the modulated symbols across a communication channel with the plurality of antenna links, providing a plurality of receive antennas at a receiver to collect incoming transmissions and decoding received baseband signals with a space-time decoder.

BRIEF DESCRIPTION OF THE DRAWINGS

The various aspects, advantages and novel features of the present invention will be more readily comprehended from the following detailed description when read in conjunction with the appended drawings in which.

Throughout the drawing figures, like reference numerals will be understood to refer to like parts and components.

DETAILED DESCRIPTION OF THE PREFERRED EMBODIMENTS

Figure 1:
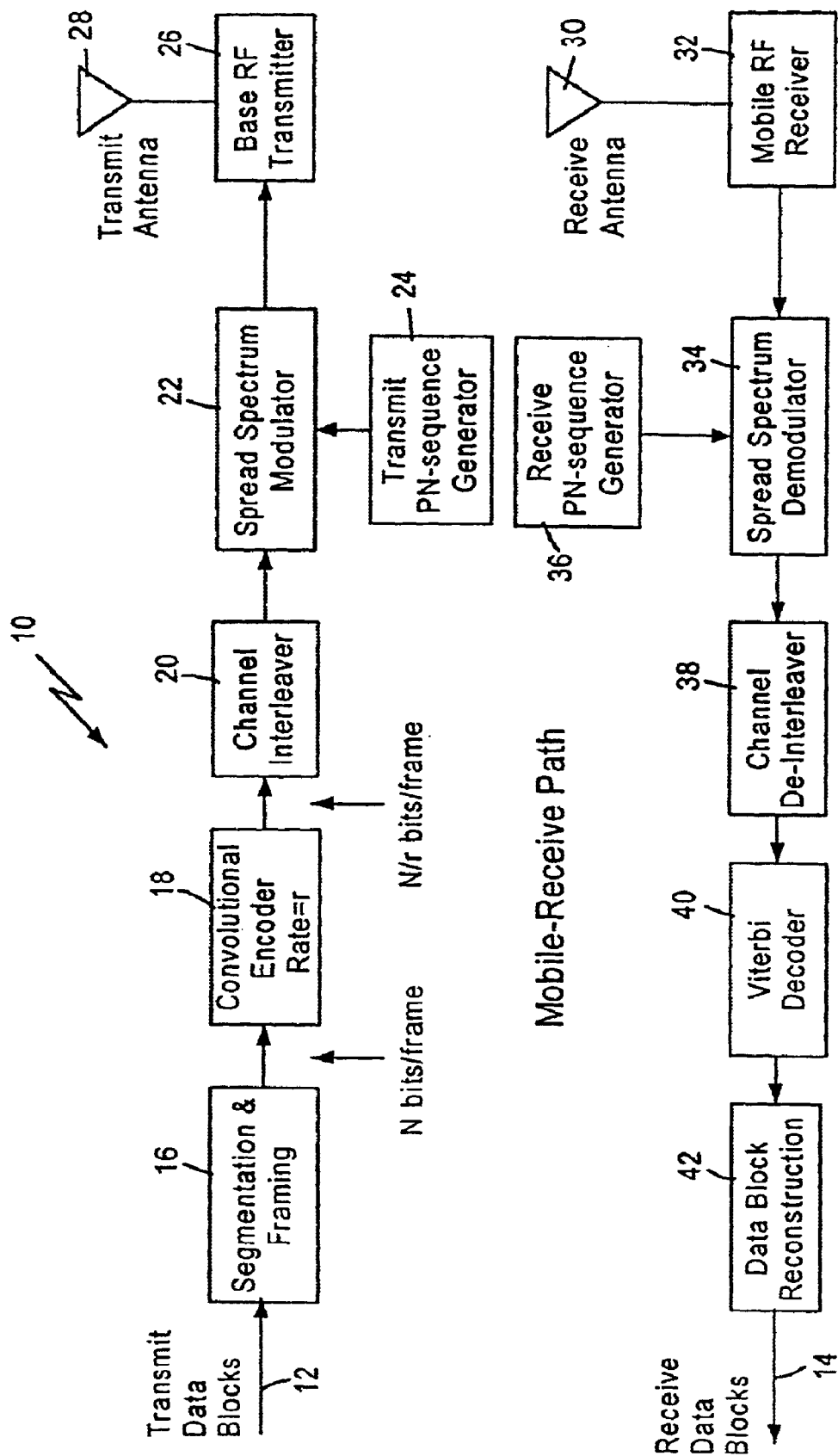
FIG. 1 is a block diagram of an exemplary digital cellular Direct Sequence Code Division Multiple Access (DS-CDMA) base-station-to-mobile-station (or forward) link.

Referring to FIG. 1, by way of an example, a conventional digital cellular Direct Sequence Code Division Multiple Access (DSCDMA) base-station-to-mobile-station (or forward) link 10 is shown using a conventional convolutional encoder and Viterbi decoder. FIG. 1 also illustrates the mobile-station-to-base-station (or reverse) link.

At the transmit end, the system 10 in FIG. 1 comprises a data segmentation and framing module 16 where user information bits are assembled into fixed length frames from transmit data blocks 12. The N bits per frame are input to the base station's convolutional encoder 18 of rate r, which produces N/r code symbols at the input of the channel interleaver 20. The channel interleaver 20 performs pseudo-random shuffling of code symbols, and outputs the re-arranged symbols to the spread spectrum modulator 22. The spread spectrum modulator 22 uses a user-specific transmit PN-code generator 24 to produce a spread spectrum signal which is carried on a RF carrier to the transmitter 26, where a high power amplifier coupled to the transmit antenna 28 radiates the signal to the base station. The techniques of spread spectrum modulation and RF transmission are well known art to one familiar with spread spectrum communications systems.

The signal received at the mobile station antenna 30 is amplified in the RF receiver 32 and demodulated by the spread spectrum demodulator 34, which uses the same PN-code generator 36 as used by the base station transmitter to de-spread the signal. The demodulated symbols are de-interleaved by the channel de-interleaver 38 and input to the Viterbi decoder 40. The decoded information bits are reconstructed using data block reconstruction 42 into receive data blocks 14 and forwarded to the data terminal equipment at the receive end.

Figure 2:
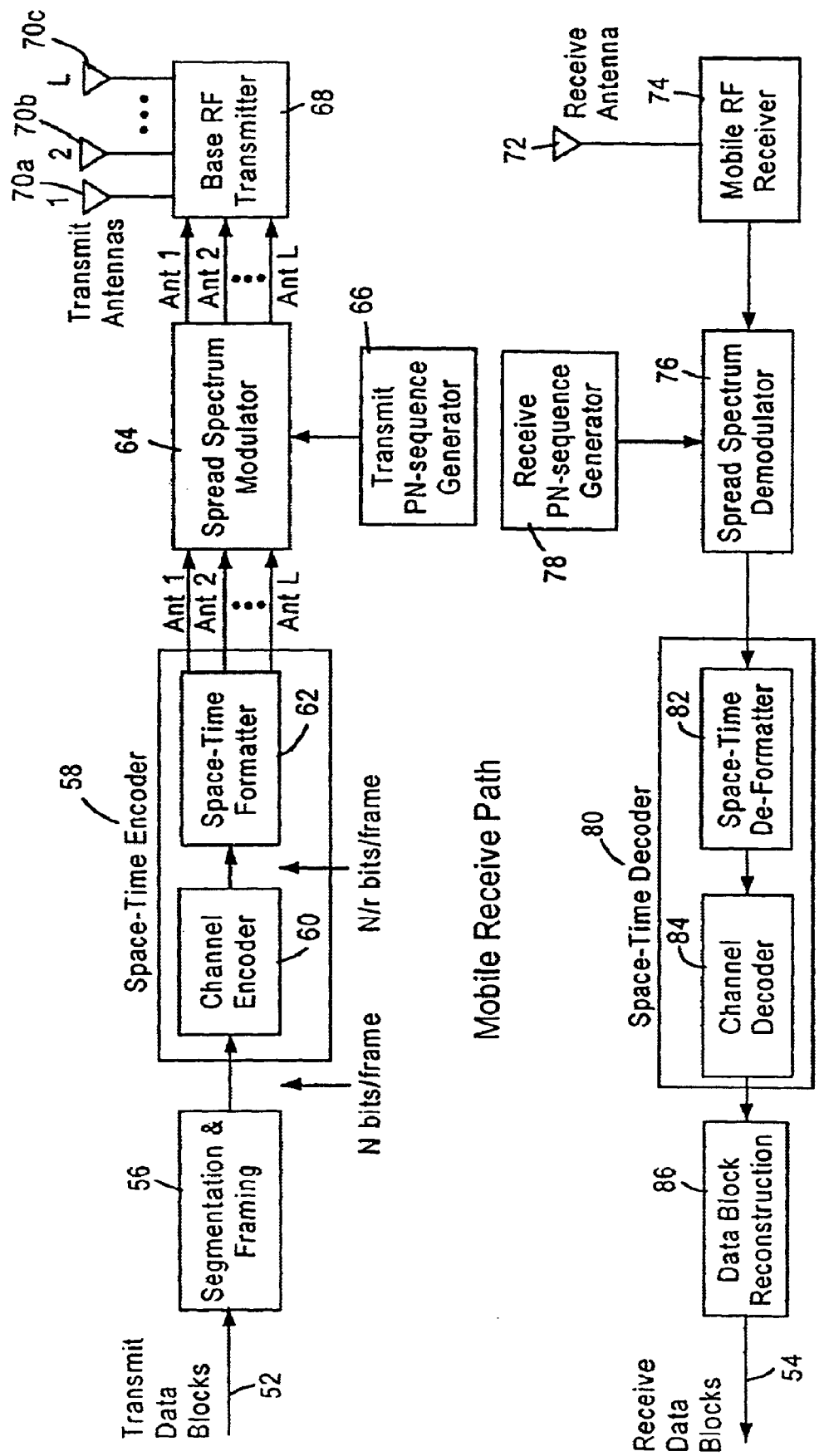
FIG. 2 is a block diagram of a system for a digital cellular system which implements space-time encoding and decoding in accordance with an embodiment of the present invention.

With reference to FIG. 2, a digital cellular base-station-to-mobile-station link is shown to illustrate the implementation of space-time encoding and decoding in accordance with an embodiment of the present invention. While CDMA system is used as an example, one familiar with the art would consider the present invention applicable to other types of wireless systems, which can employ other types of multiple access methods such as time division multiple access (TDMA).

Transmit data blocks 52 from the data terminal equipment are segmented and framed 56 into fixed frame length and applied to the mobile's channel space-time encoder 58. The output from a channel encoder 60 is fed to the space-time formatter 62 which determines the parsing (allocation and presentation order) of the coded symbols to the various transmit antennas 70a, 70b, 70c. The spatial formatter output is applied to the spread spectrum modulator 64 which uses a user specific PN-code generator 66 to create spread spectrum signals, carried on a RF carrier via base RF transmitter 68, to the mobile station transmitter. The transmitter, with high power amplifier coupled to the Transmit antenna, radiates the signals via separate transmit antennas to the mobile station.

The signal received at one or more mobile station antenna (s) 72 is amplified in the mobile RF receiver 74 and demodulated in a phase shift keying demodulator 76, which uses the same PN-code generator 78 as used by the base station transmitter, to de-spread the signal. The demodulated symbols are processed at space-time decoder 80 by the space-time de-formatter 82 and input to the channel decoder 84. The decoded information bits are reconstructed 86 into receive data blocks 54 and forwarded to the data terminal equipment at the receive end. Based on the space-time code used, the de-formatter 82 and the decoder 84 can be grouped in a single maximum likelihood receiver.

Figure 3:
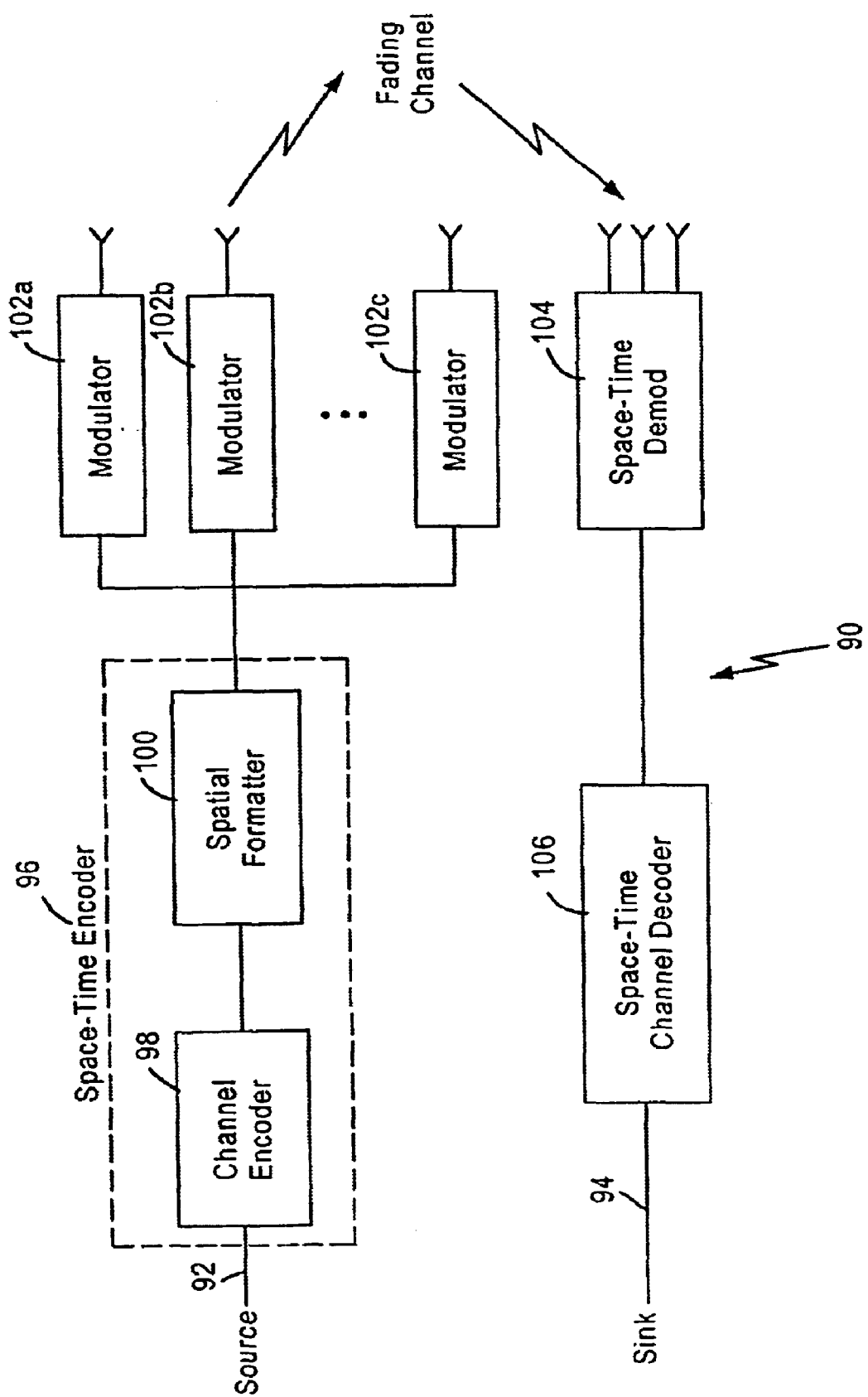
FIG. 3 is a block diagram illustrating space-time encoding and decoding in accordance with an embodiment of the present invention.

FIG. 3 illustrates an exemplary communication system 90 having a path 92 from a source and a path 94 to a sink and which can be a system other than a cellular system. The system 90 has a space-time encoder 96 that is similar to the encoder 58 depicted in FIG. 2 in that it comprises a channel encoder 98 and a spatial formatter 100. Plural modulators 102a, 102b, 102c, and so on, are also provided. At the receiver end, a space-time demodulator 104 and a space-time decoder 106 are provided.

With continued reference to FIG. 3, the source generates k information symbols from a discrete alphabet X on the path 92 which are encoded by an error control code C by the space-time encoder 96. The space-time encoder 96 produces code words of length N over the symbol alphabet Y. The encoded symbols are mapped by the modulators 102a, 102b, 102c, and so on, onto constellation points from a discrete, complex-valued signaling constellation for transmission across the channel. The modulated radio frequency signals for all of the L transmit antennas 102a, 102b, 102c, and so on, are transmitted at the same time to the receiver space-time demodulator 104. The space-time channel decoder 106 decodes the signals to the received data path 94. As shown, the receiver provides M receive antennas to collect the incoming transmissions. The received baseband signals are subsequently decoded by the space-time decoder 106. The space-time code preferably includes an underlying error control code, together with the spatial parsing format as discussed below.

Figure 4:
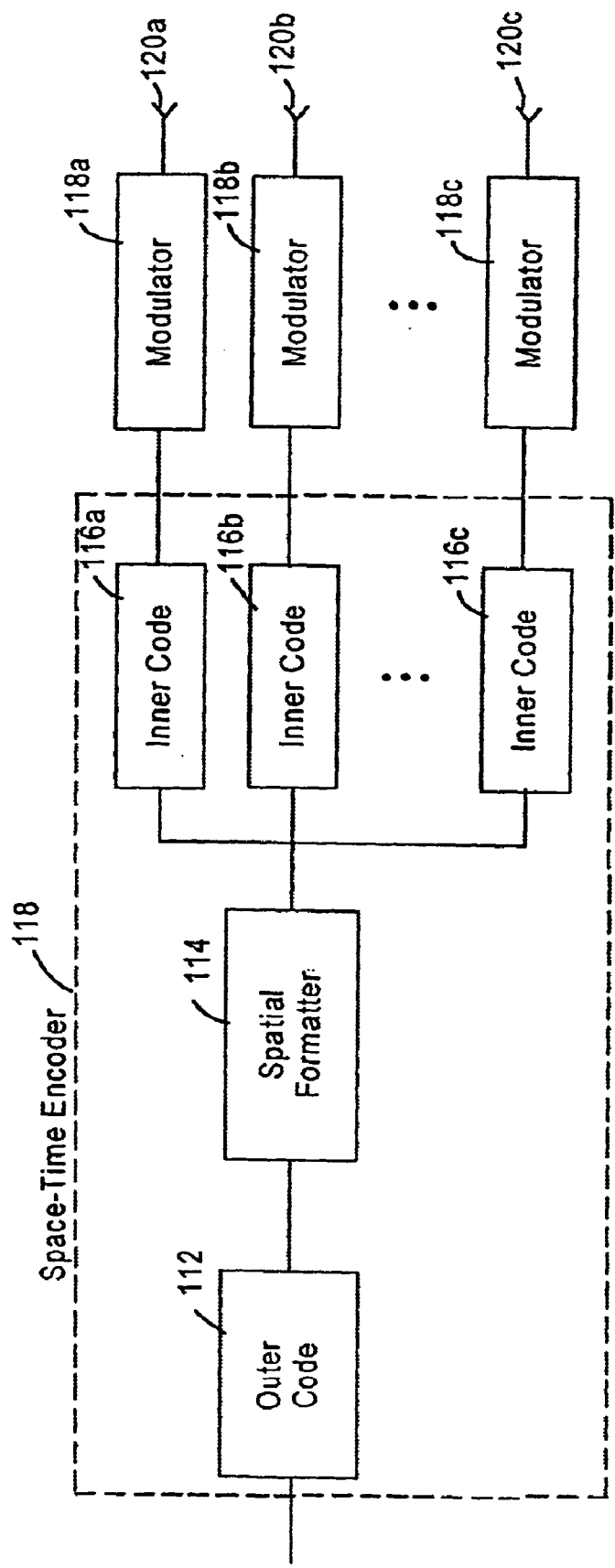
FIG. 4 is a block diagram of a full-diversity space-time concatenated encoder constructed in accordance with an embodiment of the present invention.
Figure 5A:
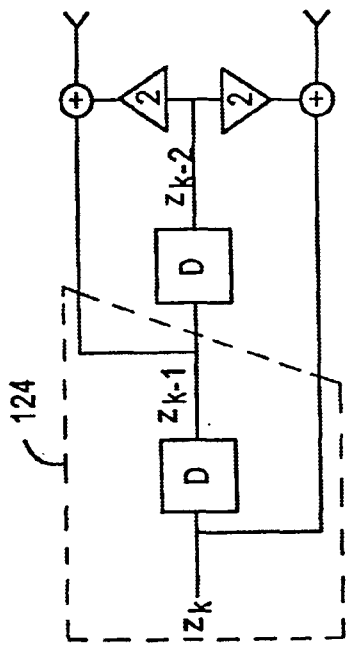
FIGS. 5a, 5b, 5c and 5d illustrate how known space-time codes for QPSK modulation over slow fading channels complies with general design rules selected in accordance with an embodiment of the present invention.
Figure 5B:
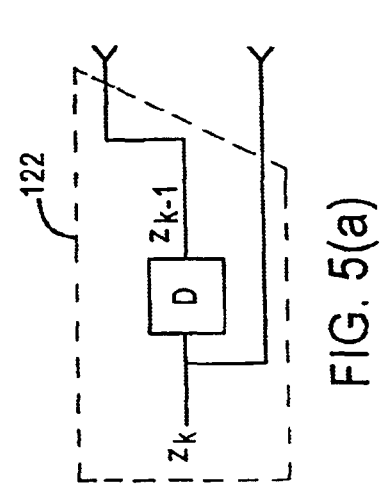
Figure 5D:
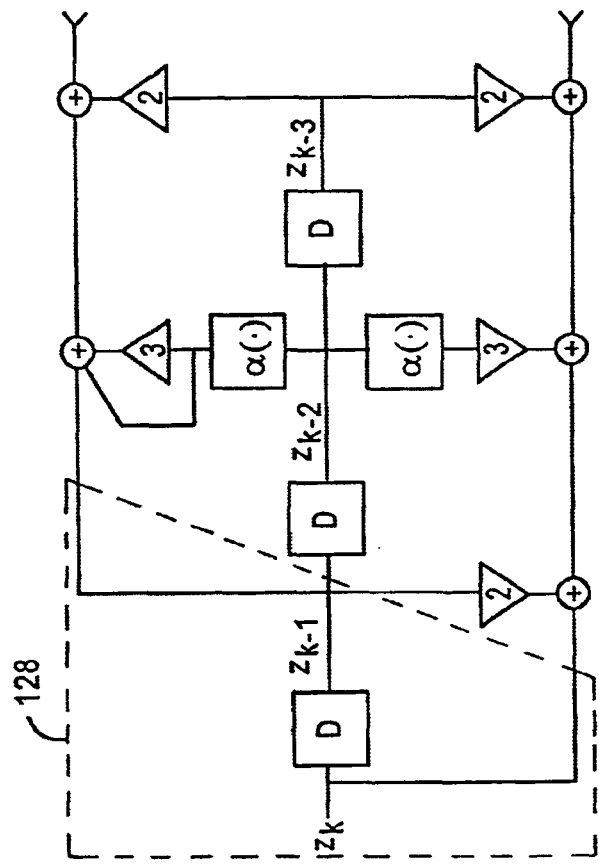
Figure 5C:
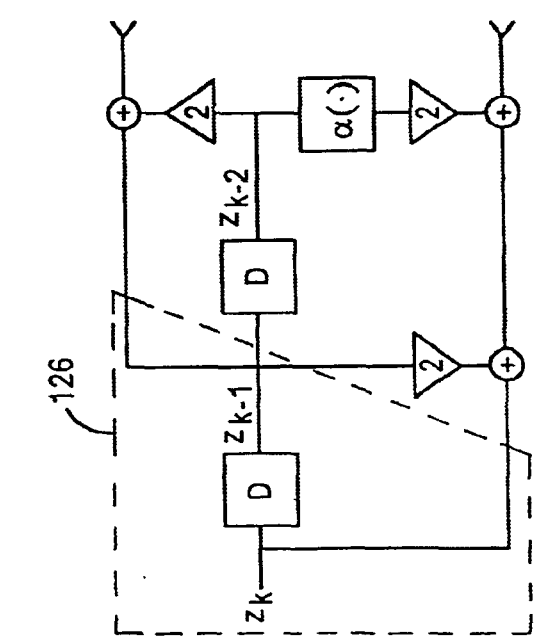

FIG. 4 depicts an exemplary concatenated space-time encoder 110 for implementing a full- diversity space-time concatenated coding sequence. The coding sequence employs an outer code 112 which provides signals to a spatial formatter 114. Signals from the spatial formatter 114 are separated for coding at inner code 116a, 116b, 116c, and so on, which provide signals that are modulated, respectively, by modulators 118a, 118b, 118c, and so on, for transmission via antennas 120a, 120b, 120c, and so on. A convolutional encoder applying the binary rank criterion for QPSK modulated space-time codes is shown in block diagram form in FIGS. 5a through 5d in which known trellis space-time codes proposed for QPSK modulation are shown to comply with the general design rules of the present invention. Space-time trellis codes are shown in FIGS. 5a through 5d, respectively, for 4, 8, 16, and 32 states which achieve full spatial diversity. As shown, the delay structures 122, 124, 126, and 128 provided for each respective code design are enough to ensure that L=2 diversity is achieved. In the text below, a number of known codes are shown to be special cases of the general constructions presented in accordance with the present invention. In addition, the present invention provides new delay diversity schemes and constructions such as examples of new BPSK space-time codes for $L \geq 2$ and new QPSK space-time codes for $L \geq 2$.

The present invention is concerned primarily with the design of space-time codes rather than the signal processing required to decode them. In most cases, the decoding employs known signal processing used for maximum likelihood reception.

The derivation of space-time codes from codes on graphs is a primary feature of the present invention, that is, to define constraints on matrices for linear codes based on graphs to provide full spatial diversity as space-time codes and therefore to design graphical codes for space-time applications. The matrices can be obtained using the present invention. Graphical codes designed in this manner can be decoded using soft-input, soft-output techniques. Thus, performance is close to the Shannon limit. Accordingly, the code constructions or designs of the present invention define the state-of-the-art performance of space-time codes. An improvement of iterative soft-input, soft-output decoding for a space-time channel is marginalization since the receiver need only access the sum of the transmission from the L transmit antennas. This marginalization is improved via iteration.

A general stacking construction for BPSK and QPSK codes in quasi-static fading channels is presented as another novel feature of the present invention. Examples of this construction are given by the rate 1/L binary convolutional codes for BPSK modulation. A preferred class of QPSK modulated codes is the linear rate 1/L convolutional codes over the integers modulo 4. Specific examples of selected block and concatenated coding schemes for L=2 and L=3 antennas with BPSK and QPSK modulation are provided below. In addition, a dyadic construction for QPSK signals using two binary full rank codes is also described below.

Another example is provided below of an expurgated, punctured version of the Golay code $G_{23}$ that can be formatted as a BPSK-modulated space-time block code achieving full L=2 spatial diversity and maximum bandwidth efficiency (rate 1 transmission). For L=3 diversity, an explicit rate 1 space-time code is derived below which achieves full spatial diversity for BPSK and QPSK modulation. By contrast, known space-time block codes derived from complex, generalized orthogonal designs provide no better bandwidth efficiency than rate ¾.

The de-stacking construction is a method of obtaining good space-time overlays for existing systems for operation over time-varying fading channels. The key advantage of these systems is that of robustness because they exploit time and space diversity. There is coding gain both spatially (from the space-time "stacking") and temporally (conventional coding gain achieved by "de-stacking"). The system is not dependent entirely on the spatial diversity, which may not be available under all deployment and channel circumstances. Examples of these are obtained from de-stacking the rate 1/L convolution codes (BPSK) and (QPSK).

Multi-level code constructions with multi-stage decoding also follow the design criteria of the present invention. Since binary decisions are made at each level, the BPSK design methodology of the present invention applies. For 8-PSK, the binary rank criteria developed for BPSK and QPSK cases also apply for the special case of L=2 antennas. This allows more sophisticated L=2 designs for PSK than is currently commercially available.

The design of space-time codes in accordance with the present invention will now be described. In Section 1, binary rank criteria for BPSK and QPSK-modulated space-time codes are discussed which are selected in accordance with the present invention. Sections 2 and 3 expand on the use of these criteria to develop comprehensive design criteria in accordance with the present invention. In Section 2, new fundamental constructions for BPSK modulation are provided in accordance with the present invention that encompass such special cases as transmit delay diversity schemes, rate 1/L convolutional codes, and certain concatenated coding schemes. The general problem of formatting existing binary codes into full-diversity space-time codes is also discussed. Specific space-time block codes of rate 1 for L=2 and L=3 antennas are given that provide coding gain, as well as achieve full spatial diversity. In Section 3, $\mathbb{Z}_4$ analogs of the binary theory are provided in accordance with the present invention. It is also shown that full diversity BPSK designs lift to full diversity QPSK designs. In Section 4, the existing body of space-time trellis codes is shown to fit within the code design criteria of the present invention. Extension of the design criteria to time-varying channels is discussed in Section 5, which describes how multi-stacking constructions in accordance with the present invention provide a general class of "smart-greedy" space-time codes for such channels. Finally, Section 6 discusses the applicability of the binary rank criteria to multi-level constructions for higher-order constellations.

1 BINARY RANK CRITERIA FOR SPACE-TIME CODES

The design of space-time codes is hampered by the fact that the rank criterion applies to the complex-valued differences between the baseband versions of the code words. It is not easy to transfer this design criterion into the binary domain where the problem of code design is relatively well understood. In section 1, general binary design criteria are provided that are sufficient to guarantee that a space-time code achieves full spatial diversity.

In the rank criterion for space-time codes, the sign of the differences between modulated code word symbols is important. On the other hand, it is difficult to see how to preserve that information in the binary domain. In accordance with the present invention, what can be said in the absence of such specific structural knowledge is investigated by introducing the following definition.

Definition 2 Two complex matrices $r_1$ and $r_2$ is said to be ω-equivalent if $r_1$ can be transformed into $r_2$ by multiplying any number of entries of $r_1$ by powers of the complex number ω.

Interest primarily lies in the ω-equivalence of matrices when ω is a generator for the signalling constellation Ω. Since BPSK and QPSK are of particular interest, the following special notation is introduced:

$BPSK(\omega = -1)$: $r_1 \doteq r_2$ denotes that $r_1$ and $r_2$ are $(-1)$-equivalent $QPSK(\omega = i = \sqrt{-1})$: $r_1 \doteq r_2$ denotes that $r_1$ and $r_2$ are $i$-equivalent Using this notion, binary rank criteria for space-time codes are derived that depend only on the unmodulated code words themselves. The binary rank criterion provides a complete characterization for BPSK-modulated codes (under the assumption of lack of knowledge regarding signs in the baseband differences). It provides a highly effective characterization for QPSK-modulated codes that, although not complete, provides a fertile new framework for space-time code design.

The BPSK and QPSK binary rank criteria simplify the problem of code design and the verification that full spatial diversity is achieved. They apply to both trellis and block codes and for arbitrary numbers of transmit antennas. In a sense, these results show that the problem of achieving full spatial diversity is relatively easy. Within the large class of space-time codes satisfying the binary rank criteria, code design is reduced to the problem of product distance or coding advantage optimization.

1.1 BPSK—Modulated Codes

For BPSK modulation, the natural discrete alphabet is the field $\mathbb{F}=\{0,1\}$ of integers modulo 2. Modulation is performed by mapping the symbol $x \in \mathbb{F}$ to the constellation point $s=f(x)\in\{-1, 1\}$ according to the rule $s=(-1)^x$. Note that it is possible for the modulation format to include an arbitrary phase offset $e^{i\phi}$, since a uniform rotation of the constellation will not affect the rank of the matrices $f(c)-f(e)$ nor the eigenvalues of the matrices $A=(f(c)-f(e))(f(c)-f(e))^H$. Notationally, the circled operator ⊕ is used to distinguish modulo 2 addition from real- or complex-valued (+, −) operations. It will sometimes be convenient to identify the binary digits 0, 1 $\in \mathbb{F}$ with the complex numbers 0,1 $\in \mathbb{C}$. This is done herein without special comment or notation.

Theorem 3 Let $\mathcal{C}$ be a linear L×n space-time code with n≧L. Suppose that every non-zero binary code word $c \in \mathcal{C}$ has the property that every real matrix $(-1)$-equivalent to c is of full rank L. Then, for BPSK transmission, $\mathcal{C}$ satisfies the space-time rank criterion and achieves full spatial diversity L.

Proof: It is enough to note that $[(-1)^{c_1}-(-1)^{c_2}]/2 \doteq c_1 \oplus c_2$.

It turns out that $(-1)$-equivalence has a simple binary interpretation. The following lemma is used.

Lemma 4 Let M be a matrix of integers. Then the matrix equation $M\bar{x}=0$ has non-trivial real solutions if and only if it has a non-trivial integral solution $\bar{x}=[d_1, d_2, \ldots, d_L]$ in which the integers $d_1, d_2, \ldots, d_L$ are jointly relatively prime—that is, $\gcd(d_1, d_2, \ldots, d_L)=1$.

Proof: Applying Gaussian elimination to the matrix M yields a canonical form in which all entries are rational.

Hence, the null space of M has a basis consisting of rational vectors. By multiplying and dividing by appropriate integer constants, any rational solution can be transformed into an integral solution of the desired form.

Theorem 5 The L×n, (n≥L), binary matrix $c=[\bar{c}_1 \bar{c}_2 \ldots \bar{c}_L]^T$ has full rank L over the binary field $\mathbb{F}$ if and only if every real matrix $r=[\bar{r}_1 \bar{r}_2 \ldots \bar{r}_L]^T$ that is (−1)-equivalent to c has full rank L over the real field $\mathbb{R}$.

Proof: (→) Suppose that r is not of full rank over $\mathbb{R}$. Then there exist real $\alpha_1, \alpha_2, \ldots, \alpha_L$, not all zero, for which $\alpha_1 \bar{r}_1 + \alpha_2 \bar{r}_2 + \ldots + \alpha_L \bar{r}_L = 0$. By the lemma, $\alpha_i$ are assumed to be integers and jointly relatively prime. Given the assumption on r and c, $\bar{r}_i \equiv \bar{c}_i \pmod 2$. Therefore, reducing the integral equation modulo 2 produces a binary linear combination of the $\bar{c}_i$ that sums to zero. Since the $\alpha_i$ are not all divisible by 2, the binary linear combination is non-trivial. Hence, c is not of full rank over $\mathbb{F}$.

(→) Suppose that c is not of full rank over $\mathbb{F}$. Then there are rows $\bar{c}_{i_1}, \bar{c}_{i_2}, \ldots, \bar{c}_{i_\nu}$ such that $\bar{c}_{i_1} \oplus \bar{c}_{i_2} \oplus \ldots \oplus \bar{c}_{i_\nu} = \bar{0}$. Each column of c therefore contains an even number of ones among these ν rows. Hence, the +and− signs in each column can be modified to produce a real-valued summation of these ν rows that is equal to zero. This modification produces a real-valued matrix that is (−1)-equivalent to c but is not of full rank.

The binary criterion for the design and selection of linear space-time codes in accordance with the present invention now follows.

Theorem 6 (Binary Rank Criterion) Let $\mathcal{C}$ be a linear L×n space-time code with n≥L. Suppose that every non-zero binary code word $c \in \mathcal{C}$ is a matrix of full rank over the binary field $\mathbb{F}$. Then, for BPSK transmission, the space-time code $\mathcal{C}$ achieves full spatial diversity L.

The binary rank criterion makes it possible to develop algebraic code designs for which full spatial diversity can be achieved without resorting to time consuming and detailed verification. Although the binary rank criterion and of the present invention associated theorems are stated for linear codes, it is clear from the proofs that they work in general, even if the code is nonlinear, when the results are applied to the modulo 2 differences between code words instead of the code words themselves.

1.2 QPSK—Modulated Codes

For QPSK modulation, the natural discrete alphabet is the ring $\mathbb{Z}_4 = \{0, \pm 1, 2\}$ of integers modulo 4. Modulation is performed by mapping the symbol $x \in \mathbb{Z}_4$ to the constellation point $s \in \{\pm 1, \pm i\}$ according to the rule $s = i^x$, where $i = \sqrt{-1}$. Again, the absolute phase reference of the QPSK constellation can be chosen arbitrarily without affecting the diversity advantage or coding advantage of a $\mathbb{Z}_4$-valued space-time code. Notationally, subscripts are used to distinguish modulo 4 operations ($\oplus_4, \ominus_4$) from binary ($\oplus$) and real- or complex-valued (+,−) operations.

For the $\mathbb{Z}_4$ valued matrix c, the binary component matrices $\alpha(c)$ and $\beta(c)$ are defined to satisfy the expansion $$c = \beta(c) + 2\alpha(c).$$

Thus, $\beta(c)$ is the modulo 2 projection of c and $\alpha(c) = [c \ominus_4 \beta(c)]/2$.

The following special matrices are now introduced which are useful in the analysis of QPSK-modulated space-time codes:

(1) Complex-valued $\zeta(c) = c + i\beta(c)$; and (2) Binary-valued indicant projections: $\Xi(c)$ and $\Psi(c)$.

The indicant projections are defined based on a partitioning of c into two parts, according to whether the rows (or columns) are or are not multiples of two, and serve to indicate certain aspects of the binary structure of the $\mathbb{Z}_4$ matrix in which multiples of two are ignored.

A $\mathbb{Z}_4$-valued matrix c of dimension L×n is of type $1^l 2^{L-l} \times 1^m 2^{n-m}$ if it consists of exactly l rows and m columns that are not multiples of two. It is of standard type $1^l 2^{L-l} \times 1^m 2^{n-m}$ if it is of type $1^l 2^{L-l} \times 1^m 2^{n-m}$ and the first l rows and first m columns in particular are not multiples of two. When the column (row) structure of a matrix is not of particular interest, the matrix is of row type $1^l \times 2^{L-l}$ (column type $1^m \times 2^{n-m}$) or, more specifically, standard row (column) type.

Let c be a $\mathbb{Z}_4$-valued matrix of type $1^l 2^{L-l} \times 1^m 2^{n-m}$. Then, after suitable row and column permutations if necessary, it has the following row and column structure:

$$c = \begin{bmatrix} \bar{c}_1 \\ \bar{c}_2 \\ \vdots \\ \bar{c}_l \\ 2\bar{c}'_{l+1} \\ 2\bar{c}'_{l+2} \\ \vdots \\ 2\bar{c}'_L \end{bmatrix} = \begin{bmatrix} \bar{h}_1^T & \bar{h}_2^T & \ldots & \bar{h}_m^T & 2\bar{h}'^T_{m+1} & 2\bar{h}'^T_{m+2} & \ldots & 2\bar{h}'^T_n \end{bmatrix}.$$

Then the row-based indicant projection (Ξ-projection) is defined as $$\Xi(c) = \begin{bmatrix} \beta(\bar{c}_1) \\ \beta(\bar{c}_2) \\ \vdots \\ \beta(\bar{c}_l) \\ \beta(\bar{c}'_{l+1}) \\ \beta(\bar{c}'_{l+2}) \\ \vdots \\ \beta(\bar{c}'_L) \end{bmatrix}.$$

and the column-based indicant projection (Ψ-projection) is defined as $$\Psi(c) = [\beta(\bar{h}_1^T) \beta(\bar{h}_2^T) \ldots \beta(\bar{h}_m^T) \beta(\bar{h}'^T_{m+1}) \beta(\bar{h}'^T_{m+2}) \ldots \beta(\bar{h}'^T_n)].$$

Note that $$[\Psi(c)]^T = \Xi(c^T). \quad (7)$$

The first result shows that the baseband difference of two QPSK-modulated code words is directly related to the $\mathbb{Z}_4$-difference of the unmodulated code words.

Proposition 7 Let $\mathcal{C}$ be a $\mathbb{Z}_4$ space-time code. For $x, y \in \mathcal{C}_l$, let $i^x - i^y$ denote the baseband difference of the corresponding QPSK-modulated signals. Then, $$i^x - i^y \equiv \zeta(x \ominus_4 y).$$

Furthermore, any complex matrix $z = r + is$ that is (−1)-equivalent to $i^x - i^y$ has the property that $$r \equiv s \equiv \beta(x \ominus_4 y) \equiv x \oplus y \pmod 2.$$

Proof: Any component of $i^x - i^y$ can be written as $$i^x - i^y = -i^y \cdot (1 - i^\delta),$$

where $\delta = x \ominus_4 y$. Since $$1 - i^\delta = \begin{cases} 0, & \delta = 0 \\ 1 - i = -i \cdot (1+i), & \delta = 1 \\ 2, & \delta = 2 \\ 1 + i = -i \cdot (-1+i), & \delta = -1, \end{cases}$$

the entry $i^x - i^y$ can be turned into the complex number $(x \ominus_4 y) + i(x \oplus y)$ by multiplying by $\pm 1$ or $\pm i$ as necessary. Thus, $$i^x - i^y = (x \ominus_4 y) + i(x \oplus y) = \zeta(x \ominus_4 y),$$

as claimed.

For $(-1)$-equivalence, multiplication by $\pm i$ is not allowed. Under this restriction, it is no longer possible to separate z into the terms $x \ominus_4 y$ and $x \oplus y$ so cleanly; the discrepancies, however, amount to additions of multiples of 2. Hence, if $z = r + is = i^x - i^y$, then $r \equiv x \ominus_4 y \pmod 2$ and $s \equiv x \oplus y \pmod 2$.

Theorem 8 Let $\mathcal{C}$ be a linear, L×n ($n \geq L$) space-time code over $\mathbb{Z}_4$. Suppose that every non-zero code word $c \in \mathcal{C}$ has the property that every complex matrix i-equivalent to $\zeta(c)$ is of full rank L. Then, for QPSK transmission, $\mathcal{C}$ satisfies the space-time rank criterion and achieves full spatial diversity L.

Proof: Since $\mathcal{C}$ is linear, the $\mathbb{Z}_4$-difference between any two code words is also a code word. The result then follows immediately from the previous proposition.

The indicant projections of the $\mathbb{Z}_4$-valued matrix c provide a significant amount of information regarding the singularity of $\zeta(c)$ and any of its i-equivalents. Thus, the indicants provide the basis for our binary rank criterion for QPSK-modulated space-time codes.

Theorem 9 Let $c = [\bar{c}_1 \ \bar{c}_2 \ \ldots \ \bar{c}_L]^T$ be an $\mathbb{Z}_4$-valued matrix of dimension L×n, ($n \geq L$). If the row-based indicant $\Xi(c)$ or the column-based indicant $\Psi(c)$ has full rank L over $\mathbb{F}$, then every complex matrix z that is i-equivalent to $\zeta(c)$ has full rank L over the complex field $\mathbb{C}$.

Proof: Proof for the row-based indicant will now be provided. The proof for the column-based indicant is similar.

By rearranging the rows of c if necessary, any row that is a multiple of 2 can be assumed to appear as one of the last rows of the matrix. Thus, there is an l for which $\beta(\bar{c}_i) \neq 0$ whenever $1 \leq i \leq l$ and $\beta(\bar{c}_i) = 0$ for $l < i < L$. The first l rows is called the 1-part of c; the last L−rows is called the 2-part.

Suppose that $$z = \begin{bmatrix} \bar{z}_1 \\ \bar{z}_2 \\ \vdots \\ \bar{z}_L \end{bmatrix} = \begin{bmatrix} \bar{r}_1 + i\bar{s}_1 \\ \bar{r}_1 + i\bar{s}_2 \\ \vdots \\ \bar{r}_L + i\bar{s}_L \end{bmatrix}$$

is singular and is i-equivalent to $\zeta(c)$. Then there exist complex numbers $\alpha_1 = a_1 + ib_1, \alpha_2 = a_2 + ib_2, \ldots, \alpha_L = a_L + ib_L$, not all zero, for which $$\alpha_1 \bar{z}_1 + \alpha_2 \bar{z}_2 + \ldots + \alpha_L \bar{z}_L = \sum_{i=1}^{L}(a_i \bar{r}_i - b_i \bar{s}_i) + i \sum_{i=1}^{L}(b_i \bar{r}_i + a_i \bar{s}_i) = 0. \quad (8)$$

Without loss of generality, the $a_i$, $b_i$ are assumed to be integers having greatest common divisor equal to 1. Hence, there is a nonempty set of coefficients having real or imaginary part an odd integer. The coefficient $\alpha_i$ is said to be even or odd depending on whether two is or is not a common factor of $a_i$ and $b_i$. It is said to be of homogeneous parity if $a_i$ and $b_i$ are of the same parity; otherwise, it is said to be of heterogeneous parity.

There are now several cases to consider based on the nature of the coefficients applied to the 1-part and 2-part of z.

Case (i): There is an odd coefficient of heterogeneous parity applied to the 1-part of z.

In this case, taking the projection of (8) modulo 2, $$\sum_{i=1}^{l} (\beta(a_i) \oplus \beta(b_i)) \beta(\bar{c}_i) = 0,$$

since $\beta(\bar{r}_i) = \beta(\bar{s}_i) = \beta(\bar{c}_i)$ by the proposition. By assumption, at least one of the binary coefficients $\beta(a_i) \oplus \beta(b_i)$ is nonzero. Hence, this is a non-trivial linear combination of the first l rows of $\Xi(c)$, and so $\Xi(c)$ is not of full rank over $\mathbb{F}$.

Case (ii): All of the nonzero coefficients applied to the 1-part of z are homogeneous and at least one is odd; all of the coefficients applied to the 2-part of z are homogeneous (odd or even).

In this case, equation (8) is multiplied by $\alpha^*/2 = (a-ib)/2$, where $\alpha = a + ib$ is one of the coefficients applied to the 1-part of z having a and b both odd. Note that $\alpha^* \alpha_i$ is even if $\alpha_i$ is homogeneous (odd or even) and is odd homogeneous if $\alpha_i$ is heterogeneous. Hence, this produces a new linear combination, all coefficients of which still have integral real and imaginary parts. In this linear combination, one of the new coefficients is $|\alpha|^2/2 = (a^2 + b^2)/2$, which is an odd integer. The argument of case (i) now applies.

Case (iii): All of the nonzero coefficients applied to the 1-part of z are homogeneous and at least one is odd; there is a heterogeneous coefficient applied to the 2-part of z.

In this case, normalization occurs as in case (ii), using one of the odd homogeneous coefficients from the 1-part of z, say $\alpha = a + ib$. Thus, normalization produces the equation $$\tilde{\alpha}_1 \bar{z}_1 + \ldots + \tilde{\alpha}_l \bar{z}_l + \tilde{\alpha}_{l+1} \bar{z}'_{l+1} + \ldots + \tilde{\alpha}_L \bar{z}'_L = 0, \quad (9)$$

where $\tilde{\alpha}_i = \alpha^* \alpha_i / 2$ for $i \leq l$ and $\tilde{\alpha}_i = \alpha^* \alpha_i$ for $i > l$.

Taking the projection modulo 2 of the real (or imaginary) part of equation (9) yields $$0 = \sum_{i=1}^{l} [\beta(\tilde{a}_i) \oplus \beta(\tilde{b}_i)] \beta(\bar{c}_i) \oplus \sum_{i=l+1}^{L} \beta(\tilde{a}_i) \beta(\bar{r}'_i) \oplus \sum_{i=l+1}^{L} \beta(\tilde{b}_i) \beta(\bar{s}'_i)$$

$$= \sum_{i=1}^{l} [\beta(\tilde{a}_i) \oplus \beta(\tilde{b}_i)] \beta(\bar{c}_i) \oplus \sum_{i=l+1}^{L} \beta(\tilde{a}_i)(\beta(\bar{r}'_i) \oplus \beta(\bar{s}'_i)).$$

For $i \geq l+1$, it is true that $\beta(\bar{r}'_i) \oplus \beta(\bar{s}'_i) = \beta(\bar{c}'_i)$, where $\bar{c}_i = 2\bar{c}'_i$ is the i-th row of c. By assumption, there is a nonzero coefficient in each of the three component sums. Hence, equation (9) establishes a nontrivial linear combination of the rows of $\Xi(c)$.

Case (iv): All of the coefficients applied to the 1-part of z are even, and at least one of the coefficients applied to the 2-part of z is heterogeneous.

In this case, equation (8) is divided by two to get the modified dependence relation $$\alpha'_1 \bar{z}_1 + \ldots + \alpha'_l \bar{z}_l + \alpha_{l+1} \bar{z}'_{l+1} + \ldots + \alpha_L \bar{z}'_L = 0, \quad (10)$$

where $\alpha'_i = \alpha_i / 2$ and $\bar{z}'_i = \bar{z}_i / 2$. Projecting modulo 2 gives two independent binary equations corresponding to the real and imaginary parts of equation (10):

$$\sum_{i=1}^{l} [\beta(a'_i) \oplus \beta(b'_i)]\beta(\overline{c}_i) \oplus \sum_{i=l+1}^{L} \beta(a_i)\beta(\overline{r}'_i) \oplus \sum_{i=l+1}^{L} \beta(b_i)\beta(\overline{s}'_i) = 0$$

$$\sum_{i=1}^{l} [\beta(a'_i) \oplus \beta(b'_i)]\beta(\overline{c}_i) \oplus \sum_{i=l+1}^{L} \beta(b_i)\beta(\overline{r}'_i) \oplus \sum_{i=l+1}^{L} \beta(a_i)\beta(\overline{s}'_i) = 0.$$

Setting these two equal gives $$\sum_{i=l+1}^{L} [\beta(a_i) \oplus \beta(b_i)][\beta(\overline{r}'_i) \oplus \beta(\overline{s}'_i)] = 0,$$

which is a nontrivial linear combination of the rows $\beta(\overline{c}'_i) = \beta(\overline{r}'_i) \oplus \beta(\overline{s}'_i)$, for $i \leq l+1$, of $\Xi(c)$.

Case (v): All of the coefficents applied to the 1-part of z are even, and all of the coefficients applied to the two part of z are homogeneous.

In this case, equation (10) is first used after dividing by two. Recalling that at least one of the coefficients $\alpha_{l+1}, \ldots \alpha_L$ is odd, the modulo 2 projection of equation (10) is taken to get (from either the real or imaginary parts) the equation $$\sum_{i=1}^{l} [\beta(a'_i) \oplus \beta(b'_i)]\beta(\overline{c}_i) \oplus \sum_{i=l+1}^{L} \beta(a_i) [\beta(\overline{r}'_i) \oplus \beta(\overline{s}'_i)] = 0.$$

This is once again a nontrivial linear combination of the rows of $\Xi(c)$.

The binary rank criterion for QPSK space-time codes in accordance with the present invention now follows as an immediate consequence of the previous two theorems.

Theorem 10 (QPSK Binary Rank Criterion I) Let $\mathcal{C}$ be a linear L×n space-time code over $\mathbb{Z}_4$, with $n \geq L$. Suppose that, for every non-zero $c \in \mathcal{C}$, the row-based indicant $\Xi(c)$ or the column-based indicant $\Psi(c)$ has full rank L over $\mathbb{F}$. Then, for QPSK transmission, the space-time code $\mathcal{C}$ achieves full spatial diversity L.

In certain $\mathbb{Z}_4$ space-time code constructions, there may be no code word matrices having isolated rows or columns that are multiples of two. For example, it is possible for the entire code word to be a multiple of two. In this case, the following binary rank criterion is simpler yet sufficient.

Theorem 11 (QPSK Binary Rank Criterion II) Let $\mathcal{C}$ be a linear L×n space-time code over $\mathbb{Z}_4$, with $n \geq L$. Suppose that, for every non-zero $c \in \mathcal{C}$, the binary matrix $\beta(c)$ is of full rank over $\mathbb{F}$ whenever $\beta(c) \neq 0$, and $\beta(c/2)$ is of full rank over $\mathbb{F}$ otherwise. Then, for QPSK transmission, the space-time code $\mathcal{C}$ achieves full spatial diversity L.

Proof: Under the specified assumptions, either $\Xi(c) = \beta(c)$ or $\Xi(c) = \beta(c/2)$, depending on whether $\beta(c) = 0$ or not.

The QPSK binary rank criterion is a powerful tool in the design and analysis of QPSK-modulated space-time codes.

2 THEORY OF BPSK SPACE-TIME CODES

2.1 Stacking Construction

A general construction for L×n space-time codes that achieve full spatial diversity is given by the following theorem.

Theorem 12 (Stacking Construction) Let $T_1, T_2, \ldots, T_L$ be linear vector-space transformations from $\mathbb{F}^k$ into $\mathbb{F}^n$, and let $\mathcal{C}$ be the L×n space-time code of dimension k consisting of the code word matrices $$c(\overline{x}) = \begin{bmatrix} T_1(\overline{x}) \\ T_2(\overline{x}) \\ \vdots \\ T_L(\overline{x}) \end{bmatrix},$$

where $\overline{x}$ denotes an arbitrary k-tuple of information bits and $n \geq L$. Then $\mathcal{C}$ satisfies the binary rank criterion, and thus achieves full spatial diversity L, if and only if $T_1, T_2, \ldots, T_L$ have the property that $\forall a_1, a_2, \ldots, a_L \in \mathbb{F}$:

$T = a_1 T_1 \oplus a_2 T_2 \oplus \ldots \oplus a_L T_L$ is nonsingular unless $a_1 = a_2 = \ldots = a_L = 0$.

Proof: ($\rightarrow$) Suppose $\mathcal{C}$ satisfies the binary rank criterion but that $T = a_1 T_1 \oplus a_2 T_2 \oplus \ldots \oplus a_L T_L$ is singular for some $a_1, a_2, \ldots, a_L \in \mathbb{F}$. Then there is a non-zero $\overline{x}_0 \in \mathbb{F}^k$ such that $T(\overline{x}_0) = 0$. In this case, $T(\overline{x}_0) = a_1 \cdot T_1(\overline{x}_0) \oplus a_2 \cdot T_2(\overline{x}_0) \oplus \ldots \oplus a_L \cdot T_L(\overline{x}_0) = 0$ is a dependent linear combination of the rows of $c(\overline{x}_0) \in \mathcal{C}$. Since $\mathcal{C}$ satisfies the binary rank criterion, $a_1 = a_2 = \ldots = a_L = 0$.

($\leftarrow$) Suppose $T_1, T_2, \ldots, T_L$ have the stated property but that $c(\overline{x}_0) \in \mathcal{C}$ is not of full rank. Then there exist $a_1, a_2, \ldots, a_L \in \mathbb{F}$, not all zero, for which $T(\overline{x}_0) = a_1 \cdot T_1(\overline{x}_0) \oplus a_2 \cdot T_2(\overline{x}_0) \oplus \ldots \oplus a_L \cdot T_L(\overline{x}_0) = 0$, where $T = a_1 T_1 \oplus a_2 T_2 \oplus \ldots \oplus a_L T_L$. By hypothesis, T is nonsingular; hence, $\overline{x}_0 = 0$ and $c = 0$.

The vector-space transformations of the general stacking construction can be implemented as binary k×n matrices. In this case, the spatial diversity achieved by the space-time code does not depend on the choice of basis used to derive the matrices.

A heuristic explanation of the constraints imposed on the stacking construction will now be provided. In order to achieve spatial diversity L on a flat Rayleigh fading channel, the receiver is expected to be able to recover from the simultaneous fading of any L−1 spatial channels and therefore be able to extract the information vector $\overline{x}$ from any single, unfaded spatial channel (at least at high enough signal-to-noise ratio). This requires that each matrix $M_i$ be invertible. That each linear combination of the $M_i$ must also be invertible follows from similar reasoning and the fact that the transmitted symbols are effectively summed by the channel.

The use of transmit delay diversity provides an example of the stacking construction. In this scheme, the transmission from antenna i is a one-symbol-delayed replica of the transmission from antenna i−1. Let C be a linear [n, k] binary code with (nonsingular) generator matrix G, and consider the delay diversity scheme in which code word $\overline{c} = \overline{x}G$ is repeated on each transmit antenna with the prescribed delay. The result is a space-time code achieving full spatial diversity.

Theorem 13 Let $\mathcal{C}$ be the L×(n+L−1) space-time code produced by applying the stacking construction to the matrices $M_1[G0_{k \times (L-1)}], M_2 = [0_{k \times 1} G0_{k \times (L-2)}], \ldots, M_L = [0_{k \times (L-1)} G],$ where $0_{i \times j}$ denotes the all-zero matrix consisting of i rows and j columns and G is the generator matrix of a linear [n, k] binary code. Then $\mathcal{C}$ achieves full spatial diversity L.

Proof: In this construction, any linear combination of the $M_i$ has the same column space as that of G and thus is of full rank k. Hence, the stacking construction constraints are satisfied, and the space-time code $\mathcal{C}$ achieves full spatial diversity L.

A more sophisticated example of the stacking construction is given by the class of binary convolutional codes. Let C be the binary, rate 1/L, convolutional code having transfer function matrix $$G(D)=[g_1(D)g_2(D) \ldots g_L(D)].$$

The natural space-time code $\mathcal{C}$ associated with C is defined to consist of the code word matrices $c(D)=G^T(D)x(D)$, where the polynomial $x(D)$ represents the input information bit stream. In other words, for the natural space-time code, the natural transmission format is used in which the output coded bits corresponding to $g_i(x)$ are transmitted via antenna i. The trellis codes are assumed to be terminated by tail bits. Thus, if $x(D)$ is restricted to a block of N information bits, then $\mathcal{C}$ is an L×(N+ν) space-time code, where $\nu=\max_{1\le i\le L}\{\deg g_i(x)\}$ is the maximal memory order of the convolutional code C.

Theorem 14 The natural space-time code $\mathcal{C}$ associated with the rate 1/L convolutional code C satisfies the binary rank criterion, and thus achieves full spatial diversity L for BPSK transmission, if and only if the transfer function matrix G(D) of C has full rank L as a matrix of coefficients over $\mathbb{F}$.

Proof: Let $g_i(D)=g_{i0}+g_{i1}D+g_{i2}D^2+\ldots+g_{i\nu}D^\nu$, where $i=1, 2, \ldots, L$. Then, the result follows from the stacking construction applied to the generator matrices $$M_i = \begin{bmatrix} g_{i0} & g_{i1} & \cdots & g_{i\nu} & 0 & \cdots & 0 \\ 0 & g_{i0} & g_{i1} & \cdots & g_{i\nu} & \ddots & \vdots \\ \vdots & \ddots & \ddots & \ddots & \ddots & \ddots & 0 \\ 0 & \cdots & 0 & g_{i0} & g_{i1} & \cdots & g_{i\nu} \end{bmatrix},$$

each of which is of dimension N×(N+ν).

Alternately, Theorem 14 is proven by observing that $$\sum_{1\le i\le L} a_i g_i(D) x(D) = 0$$

for some $$x(D)\ne 0 \text{ iff } \sum_{1\le i\le L} a_i g_i(D) = 0.$$

This proof readily generalizes to recursive convolutional codes.

Since the coefficients of G(D) form a binary matrix of dimension L×(ν+1) and the column rank must be equal to the row rank, the theorem provides a simple bound as to how complex the convolutional code must be in order to satisfy the binary rank criterion. It has been showed that the bound is necessary for the trellis code to achieve full spatial diversity.

Corollary 15 In order for the corresponding natural space-time code to satisfy the binary rank criterion for spatial diversity L, a rate 1/L convolutional code C must have maximal memory order $\nu\ge L-1$.

Standard coding theory provides extensive tables of binary convolutional codes that achieve optimal values of free distance $d_{free}$. Although these codes are widely used in conventional systems, the formatting of them for use as space-time codes has not been studied previously. A significant aspect of the current invention is the separation of the channel code from the spatial formatting and modulation functions so that conventional channel codes can be adapted through use of the binary rank criteria of the present invention to space-time communication systems. In Table I, many optimal rate 1/L convolutional codes are listed whose natural space-time formatting in accordance with the present invention achieves full spatial diversity L. The table covers the range of constraint lengths ν=2 through 10 for L=2, 3, 4 and constraint lengths ν=2 through 8 for L=5, 6, 7, 8. Thus, Table I provides a substantial set of exemplary space-time codes of practical complexity and performance that are well-suited for wireless communication applications.

There are some gaps in Table I where the convolutional code with optimal $d_{free}$ is not suitable as a space-time code. It is straightforward, however, to find many convolutional codes with near-optimal $d_{free}$ that satisfy the stacking construction of the present invention.

In the table, the smallest code achieving full spatial diversity L has ν=L rather than ν=L−1. This is because every optimal convolutional code under consideration for the table has all of its connection polynomials of the form $g_i(D)=1+\ldots+D^\nu$; hence, the first and last columns of G(D) are identical (all ones), so an additional column is needed to achieve rank L. Other convolutional codes of more general structure with ν=L−1 could also be found using the techniques of the present invention.

TABLE I

Binary Rate 1/L Convolutional Codes with Optimal $d_{free}$ whose Natural Space-Time Codes Achieve Full Spatial Diversity

| L | ν | Connection Polynomials | $d_{free}$ |
|---|---|---|---|
| 2 | 2 | 5, 7 | 5 |
|   | 3 | 64, 74 | 6 |
|   | 4 | 46, 72 | 7 |
|   | 5 | 65, 57 | 8 |
|   | 6 | 554, 744 | 10 |
|   | 7 | 712, 476 | 10 |
|   | 8 | 561, 753 | 12 |
|   | 9 | 4734, 6624 | 12 |
|   | 10 | 4672, 7542 | 14 |
| 3 | 3 | 54, 64, 74 | 10 |
|   | 4 | 52, 66, 76 | 12 |
|   | 5 | 47, 53, 75 | 13 |
|   | 6 | 554, 624, 764 | 15 |
|   | 7 | 452, 662, 756 | 16 |
|   | 8 | 557, 663, 711 | 18 |
|   | 9 | 4474, 5724, 7154 | 20 |
|   | 10 | 4726, 5562, 6372 | 22 |
| 4 | 4 | 52, 56, 66, 76 | 16 |
|   | 5 | 53, 67, 71, 75 | 18 |
|   | 7 | 472, 572, 626, 736 | 22 |
|   | 8 | 463, 535, 733, 745 | 24 |
|   | 9 | 4474, 5724, 7154, 7254 | 27 |
|   | 10 | 4656, 4726, 5562, 6372 | 29 |
| 5 | 5 | 75, 71, 73, 65, 57 | 22 |
|   | 7 | 536, 466, 646, 562, 736 | 28 |

In the stacking construction, the information vector $\bar{x}$ is the same for all transmit antennas. This is necessary to ensure full rank in general. For example, if $T_1(\mathbb{F}^k)\cap T_2(\mathbb{F}^k)\ne\{\bar{0}\}$, then the space-time code consisting of the matrices $$c(\bar{x},\bar{y}) = \begin{bmatrix} T_1(\bar{x}) \\ T_2(\bar{y}) \end{bmatrix}$$

cannot achieve full spatial diversity even if $T_1$ and $T_2$ satisfy the stacking construction constraints. In this case choosing $\bar{x}$, $\bar{y}$ so that $T_1(\bar{x})=T_2(\bar{y})\neq\bar{0}$ produces a code word matrix having two identical rows. One consequence of this fact is that the natural space-time codes associated with non-catastrophic convolutional codes of rate k/L with k>1 do not achieve full spatial diversity.

The natural space-time codes associated with certain Turbo codes illustrate a similar failure mechanism. In the case of a systematic, rate ⅓ turbo code with two identical constituent encoders, the all-one input produces an output space-time code word having two identical rows.

2.2 New Space-time Codes From Old

Transformations of space-time codes will now be discussed.

Theorem 16 Let $\mathcal{C}$ be an L×m space-time code satisfying the binary rank criterion. Given the linear vector-space transformation $T:\mathbb{F}^m\rightarrow\mathbb{F}^n$, a new L×n space-time code $T(\mathcal{C})$ is constructed consisting of all code word matrices $$T(c) = \begin{bmatrix} T(\bar{c}_1) \\ T(\bar{c}_2) \\ \vdots \\ T(\bar{c}_L) \end{bmatrix},$$

where $c=[\bar{c}_1\ \bar{c}_2\ \ldots\ \bar{c}_L]^T\in\mathcal{C}$. Then, if T is nonsingular, $T(\mathcal{C})$ satisfies the binary rank criterion and, for BPSK transmission, achieves full spatial diversity L.

Proof: Let c, c' $\in\mathcal{C}$, and consider the difference $T(c)\oplus T(c')= T(\Delta c)$, where $\Delta c=c\oplus c'=[\Delta\bar{c}_1\ \Delta\bar{c}_2\ \ldots\ \Delta\bar{c}_L]^T\neq\bar{0}$. Suppose $$a_1 T(\Delta\bar{c}_1)\oplus a_2 T(\Delta\bar{c}_2)\oplus\ldots\oplus a_L T(\Delta\bar{c}_L)=0.$$

Then $T(\Delta\bar{c})=0$ where $\Delta\bar{c}=a_1\Delta\bar{c}_1\oplus a_2\Delta\bar{c}_2\oplus\ldots\oplus a_L\Delta\bar{c}_L$. Since T is nonsingular, $\Delta\bar{c}=0$. But since $\mathcal{C}$ satisfies the binary rank criterion, $a_1=a_2=\ldots=a_L=0$.

Column transpositions applied uniformly to all code words in $\mathcal{C}$, for example, do not affect the spatial diversity of the code. A more interesting interpretation of the theorem is provided by the concatenated coding scheme of FIG. 4 in which T is a simple differential encoder or a traditional [n, m] error control code that serves as a common inner code for each spatial transmission.

Given two full-diversity space-time codes that satisfy the binary rank criterion, they are combined into larger space-time codes that also achieve full spatial diversity. Let $\mathcal{A}$ be a linear $L\times n_A$ space-time code, and let $\mathcal{B}$ be a linear $L\times n_B$ space-time code, where $L\leq\min\{n_A, n_B\}$. Their concatenation is the $L\times(n_A+n_B)$ space-time code $\mathcal{C}_1=|\mathcal{A}|\mathcal{B}|$ consisting of all code word matrices of the form c=|a|b|, where a $\in\mathcal{A}$, b $\in\mathcal{B}$.

A better construction is the space-time code $\mathcal{C}_2=|\mathcal{A}|\mathcal{A}\oplus\mathcal{B}|$ consisting of the code word matrices c=|a|a⊕b|, where a $\in\mathcal{A}$ b $\in\mathcal{B}$. (Zero padding is used to perform the addition if $n_A\neq n_B$.) Thus $\mathcal{C}_2$ is an $L\times(n_A+\max\{n_A,n_B\})$ space-time code.

The following proposition illustrates the full spatial diversity of these codes.

Theorem 17 The space-time codes $\mathcal{C}_1=|\mathcal{A}|\mathcal{B}|$ and $\mathcal{C}_2=|\mathcal{A}|\mathcal{A}\oplus\mathcal{B}|$ satisfy the binary rank criterion if and only if the space-time codes $\mathcal{A}$ and $\mathcal{B}$ do. As an application of the theorem, codes built according to the stacking construction can also be "de-stacked."

Theorem 18 (De-stacking Construction) Let $\mathcal{C}$ be the L×n space-time code of dimension k consisting of the code word matrices $$c = \begin{bmatrix} \bar{x}M_1 \\ \bar{x}M_2 \\ \vdots \\ \bar{x}M_L \end{bmatrix},$$

where $M_1,M_2,\ldots,M_L$ satisfy the stacking construction. Let l=L/p be an integer divisor of L. Then the code $\mathcal{C}_l$ consisting of code word matrices $$c = \begin{bmatrix} \bar{x}_1 M_1 & \bar{x}_2 M_{l+1} & \ldots & \bar{x}_p M_{(p-1)l+1} \\ \bar{x}_1 M_2 & \bar{x}_2 M_{l+2} & \ldots & \bar{x}_p M_{(p-1)l+2} \\ \vdots & \vdots & \ddots & \vdots \\ \bar{x}_1 M_l & \bar{x}_2 M_{2l} & \ldots & \bar{x}_p M_L \end{bmatrix}$$

is an L/p×pn space-time code of dimension pk that achieves full diversity L/p. Setting $\bar{x}_1=\bar{x}_2=\ldots=\bar{x}_p=\bar{x}$ produces an L/p×pn space-time code of dimension k that achieves full diversity.

More generally, the following construction is provided in accordance with the present invention.

Theorem 19 (Multi-stacking Construction) Let $M=\{M_1, M_2,\ldots,M_L\}$ be a set of binary matrices of dimension k×n, $n\geq k$, that satisfy the stacking construction constraints. For $i=1,2,\ldots,m$, let $(M_{1i}, M_{2i},\ldots,M_{li})$ be an l-tuple of distinct matrices from the set M. Then, the space-time code $\mathcal{C}$ consisting of the code words $$c = \begin{bmatrix} \bar{x}_1 M_{11} & \bar{x}_2 M_{12} & \ldots & \bar{x}_m M_{1m} \\ \bar{x}_1 M_{21} & \bar{x}_2 M_{22} & \ldots & \bar{x}_m M_{2m} \\ \vdots & \vdots & \ddots & \vdots \\ \bar{x}_1 M_{l1} & \bar{x}_2 M_{l2} & \ldots & \bar{x}_m M_{lm} \end{bmatrix},$$

is an l×mn space-time code of dimension mk that achieves full spatial diversity l. Setting $\bar{x}_1=\bar{x}_2=\ldots=\bar{x}_m=\bar{x}$ produces an l×mn space-time code of dimension k that achieves full spatial diversity.

These modifications of an existing space-time code implicitly assume that the channel remains quasi-static over the potentially longer duration of the new, modified code words. Even when this implicit assumption is not true and the channel becomes more rapidly time-varying, however, these constructions are still of interest. In this case, the additional coding structure is useful for exploiting the temporal as well as spatial diversity available in the channel. Section 5 discusses this aspect of the invention.

2.3 Space-time Formatting of Binary Codes

Whether existing "time-only" binary error-correcting codes C can be formatted in a manner so as to produce a full-diversity space-time code $\mathcal{C}$ is now discussed. It turns out that the maximum achievable spatial diversity of a code is not only limited by the code's least weight code words but also by its maximal weight code words.

Theorem 20 Let C be a linear binary code of length n whose Hamming weight spectrum has minimum nonzero value $d_{min}$ and maximum value $d_{max}$. Then, there is no BPSK transmission format for which the corresponding space-time code $\mathcal{C}$ achieves spatial diversity $L>\min\{d_{min}, n-d_{max}+1\}$.

Proof: Let c be a code word of Hamming weight d=wt c. Then, in the baseband difference matrix $(-1)^c-(-1)^0$, between c and the all-zero code word 0, the value −2 appears d times and the value 0 appears n−d times. Thus, the rank can be no more than d, since each independent row must have a nonzero entry, and can be no more than n−d+1 since there must not be two identical rows containing only −2 entries. Therefore, the space-time code achieves spatial diversity at most $$L \leq \min_{c \in c}\{wtc, n - wtc + 1\} = \min\{d_{min}, n - d_{max} + 1\}.$$

This provides a general negative result useful in ruling out many classes of binary codes from consideration as space-time codes.

Corollary 21 If C is a linear binary code containing the all-1 code word, then there is no BPSK transmission format for which the corresponding space-time code $\mathcal{C}$ achieves spatial diversity L>1. Hence, the following binary codes admit no BPSK transmission format in which the corresponding space-time code achieves spatial diversity L>1:

Repetition codes

Reed-Muller codes

Cyclic codes.

As noted in the discussion of the stacking construction, it is possible to achieve full spatial diversity using repetition codes in a delay diversity transmission scheme. This does not contradict the corollary, however, since the underlying binary code in such a scheme is not strictly speaking a repetition code but a repetition code extended with extra zeros.

2.4 Exemplary Special Cases

In this section, special cases of the general theory for two and three antenna systems are considered exploring alternative space-time transmission formats and their connections to different partitionings of the generator matrix of the underlying binary code.

L=2 Diversity.

Let G=[I P] be a left-systematic generator matrix for a [2k, k] binary code C, where I is the k×k identity matrix. Each code word row vector $\bar{c}=(\bar{a}_I\ \bar{a}_p)$ has first half $\bar{a}_I$ consisting of all the information bits and second half $\bar{a}_p$ consisting of all the parity bits, where $$\bar{a}_p = \bar{a}_I P.$$

Let $\mathcal{C}$ be the space-time code derived from C in which the information bits are transmitted on the first antenna and the parity bits are transmitted simultaneously on the second antenna. The space-time code word matrix corresponding to $\bar{c}=(\bar{a}_I\ \bar{a}_p)$ is given by $$c = \begin{bmatrix} \bar{a}_I \\ \bar{a}_P \end{bmatrix}.$$

The following proposition follows immediately from the stacking construction theorem.

Proposition 22 If the binary matrices P and I⊕P are of full rank over $\mathbb{F}$, then the space-time code $\mathcal{C}$ achieves full L=2 spatial diversity. As a nontrivial example of a new space-time block code achieving L=2 spatial diversity, it is noted that both $$P = \begin{bmatrix} 1 & 0 & 1 & 1 & 1 & 1 & 1 & 1 & 1 & 1 & 1 \\ 0 & 1 & 1 & 1 & 0 & 1 & 1 & 0 & 0 & 0 & 1 \\ 1 & 1 & 1 & 0 & 1 & 1 & 1 & 0 & 0 & 1 & 0 \\ 1 & 1 & 0 & 1 & 1 & 1 & 0 & 0 & 1 & 0 & 1 \\ 0 & 1 & 1 & 1 & 1 & 0 & 0 & 1 & 0 & 1 & 1 \\ 1 & 1 & 1 & 1 & 0 & 0 & 0 & 0 & 1 & 1 & 0 \\ 1 & 1 & 1 & 0 & 0 & 0 & 1 & 1 & 1 & 0 & 1 \\ 1 & 1 & 0 & 0 & 0 & 1 & 0 & 1 & 0 & 1 & 1 \\ 0 & 1 & 0 & 0 & 1 & 0 & 1 & 0 & 1 & 1 & 1 \\ 0 & 1 & 0 & 1 & 0 & 1 & 1 & 1 & 1 & 1 & 0 \\ 0 & 1 & 1 & 0 & 1 & 1 & 0 & 1 & 1 & 0 & 0 \end{bmatrix}$$

and I⊕P are nonsingular over $\mathbb{F}$. Hence, the stacking construction produces a space-time of code $\mathcal{C}$ achieving full L=2 spatial diversity. The underlying binary code C, with generator matrix G=[I|P], is an expurgated and punctured version of the Golay code $G_{23}$. This is the first example of a space-time block code that achieves the highest possible bandwidth efficiency and provides coding gain as well as full spatial diversity.

The following proposition shows how to derive other L=2 space-time codes from a given one.

Proposition 23 If the binary matrix P satisfies the conditions of the above theorem, so do the binary matrices $P^2$, $P^T$, and $UPU^{-1}$, where U is any change of basis matrix.

The (a|a+b) constructions are now reconsidered for the special case L=2. Let A and B be systematic binary [2k, k] codes with minimum Hamming distances $d_A$ and $d_B$ and generator matrices $G_A$=[I $P_A$] and $G_B$=[I $P_B$], respectively. From the stacking construction, the corresponding space-time codes $\mathcal{A}$ and $\mathcal{B}$ have code word matrices $$c_A = \begin{bmatrix} \bar{a}_I \\ \bar{a}_I P_A \end{bmatrix}, c_B = \begin{bmatrix} \bar{b}_I \\ \bar{b}_I P_B \end{bmatrix}.$$

The |a|a⊕b| construction produces a binary [4k,2k] code C with minimum Hamming distance $d_c$=min$\{2d_A, d_B\}$. A nonsystematic generator matrix for C is given by $$G_C = \begin{bmatrix} G_A & G_A \\ 0 & G_B \end{bmatrix} = \begin{bmatrix} I & P_A & I & P_A \\ 0 & 0 & I & P_B \end{bmatrix}.$$

Applying the stacking construction using the left and right halves of $G_c$ gives the space-time code $\mathcal{C}$=|$\mathcal{A}$|$\mathcal{A}$⊕$\mathcal{B}$| of Theorem 22, in which the code word matrices are of non-systematic form:

$$c_C = \begin{bmatrix} \bar{a}_I & \bar{a}_I \oplus \bar{b}_I \\ \bar{a}_I P_A & \bar{a}_I P_A \oplus \bar{b}_I P_B \end{bmatrix}.$$

A systematic version is now derived in accordance with the present invention.

Proposition 24 Let $\mathcal{A}$ and $\mathcal{B}$ be 2×k space-time codes satisfying the binary rank criterion. Let $\mathcal{C}_s$ be the 2×2k space-time code consisting of the code word matrices $$c = \begin{bmatrix} \bar{a}_I & \bar{b}_I \\ \bar{a}_I P_A & \bar{a}_I P_A \oplus (\bar{a}_I \oplus \bar{b}_I) P_B \end{bmatrix}.$$

Then $\mathcal{C}_s$ also satisfies the binary rank criterion and achieves full L=2 spatial diversity.

Proof: Applying Gaussian elimination to $G_c$ and reordering columns produces the systematic generator matrix $$G_C = [I_{2k \times 2k} P_C],$$

where $$P_C = \begin{bmatrix} P_A & P_A \oplus P_B \\ 0 & P_B \end{bmatrix}.$$

Note that $P_C$ is nonsingular since $P_A$ and $P_B$ are both nonsingular. Likewise, $$I_{2k \times 2k} \oplus P_C = \begin{bmatrix} I \oplus P_A & P_A \oplus P_B \\ 0 & I \oplus P_B \end{bmatrix}$$

is nonsingular since $I \oplus P_A$ and $I \oplus P_B$ are. The rest follows from the stacking construction.

An alternate transmission format for 2×k space-time codes is now considered. Let C be a linear, left-systematic [2k, k] code with generator matrix $$G = \begin{bmatrix} I & 0 & A_{11} & A_{12} \\ 0 & I & A_{21} & A_{22} \end{bmatrix}$$

where the submatrices I, 0, and $A_{ij}$ are of dimension k/2×k/2. In the new transmission format, the information vector is divided into two parts $\bar{x}_1$ and $\bar{x}_2$ which are transmitted across different antennas. Thus, the corresponding space-time code $\mathcal{C}$ consists of code word matrices of the form $$c = \begin{bmatrix} \bar{x}_1 & \bar{p}_1 \\ \bar{x}_2 & \bar{p}_2 \end{bmatrix},$$

where $\bar{p}_1 = \bar{x} x_1 A_{11} \oplus \bar{x}_2 A_{21}$ and $\bar{p}_2 = \bar{x}_1 A_{12} \oplus \bar{x}_2 A_{22}$.

For such codes, the following theorem gives sufficient conditions on the binary connection matrices to ensure full spatial diversity of the space-time code.

Proposition 25 Let $A_{12}$, $A_{21}$, and $A = \Sigma_{i=1}^{2}(A_{i1} \oplus A_{i2})$ be non-singular matrices over $\mathbb{F}$. Then the space-time code $\mathcal{C}$ achieves full L=2 spatial diversity.

Proof: The conditions follow immediately from the stacking construction theorem applied to the matrices $$M_1 = \begin{bmatrix} I & A_{11} \\ 0 & A_{21} \end{bmatrix}, M_2 = \begin{bmatrix} 0 & A_{12} \\ I & A_{22} \end{bmatrix},$$

since the sum $M = M_1 \oplus M_2$ may be reduced to the form $$M = \begin{bmatrix} I & A_{11} \oplus A_{12} \\ 0 & A \end{bmatrix}$$

by Gaussian elimination.

The conditions of the proposition are not difficult to satisfy. For example, consider the linear 2×4 space-time code $\mathcal{C}$ whose code words $$c = \begin{bmatrix} x_{11} & x_{12} & p_{11} & p_{12} \\ x_{21} & x_{22} & p_{21} & p_{22} \end{bmatrix}$$

are governed by the parity check equations $$p_{11} = x_{12} \oplus x_{21} \oplus x_{22}$$

$$p_{12} = x_{12} \oplus x_{22}$$

$$p_{21} = x_{11} \oplus x_{21}$$

$$p_{22} = x_{11} \oplus x_{12} \oplus x_{21}.$$

The underlying binary code C has a generator matrix with submatrices $$A_{11} = \begin{bmatrix} 0 & 0 \\ 1 & 1 \end{bmatrix}$$

$$A_{12} = \begin{bmatrix} 1 & 1 \\ 0 & 1 \end{bmatrix}$$

$$A_{21} = \begin{bmatrix} 1 & 0 \\ 1 & 1 \end{bmatrix}$$

$$A_{22} = \begin{bmatrix} 1 & 1 \\ 0 & 0 \end{bmatrix},$$

which meet the requirements of the proposition. Hence, $\mathcal{C}$ achieves 2-level spatial diversity. L=3 Diversity.

Similar derivations for L=3 antennas are straightforward. The following example is interesting in that it provides maximum possible bandwidth efficiency (rate 1 transmission) while attaining full spatial diversity for BPSK or QPSK modulation. The space-time block codes derived from complex generalized orthogonal designs for L>2, on the other hand, achieve full diversity only at a loss in bandwidth efficiency. The problem of finding generalized orthogonal designs of rates greater than ¾ for L>2 is a difficult problem. Further, rate 1 space-time block codes of short length can not be designed by using the general method of delay diversity. By contrast, the following rate 1 space-time block code for L=3 is derived by hand.

Let $\mathcal{C}$ consist of the code word matrices $$c = \begin{bmatrix} \bar{x} M_1 \\ \bar{x} M_2 \\ \bar{x} M_3 \end{bmatrix},$$

where $$M_1 = \begin{bmatrix} 1 & 0 & 0 \\ 0 & 1 & 0 \\ 0 & 0 & 1 \end{bmatrix}, M_2 = \begin{bmatrix} 0 & 0 & 1 \\ 1 & 0 & 1 \\ 0 & 1 & 0 \end{bmatrix}, M_3 = \begin{bmatrix} 0 & 1 & 0 \\ 0 & 1 & 1 \\ 1 & 0 & 1 \end{bmatrix}.$$

It is easily verified that $M_1$, $M_2$, $M_3$ satisfy the stacking construction constraints. Thus, $\mathcal{C}$ is a 3×3 space-time code achieving full spatial diversity (for QPSK as well as BPSK transmission). Since $\mathcal{C}$ admits a simple maximum likelihood decoder (code dimension is three), it can be used as a 3-diversity space-time applique for BPSK- or QPSK-modulated systems similar to the 2-diversity orthogonal design scheme.

Similar examples for arbitrary L>3 can also be easily derived. For example, matrix $M_1$ can be interpreted as the unit element in the Galois field $GF(2^3)$; $M_2$ as the primitive element in $GF(2^3)$ satisfying $\alpha^3=1+\alpha$; and $M_3$ as its square $\alpha^2$. Since $1, \alpha, \alpha^2$ are linear independent over $\mathbb{F}$, the BPSK stacking construction of the current invention is satisfied. Any set of linearly independent elements from $GF(2^3)$ can be similarly expressed as a set of 3×3 matrices satisfying the BPSK stacking construction and hence would provide other examples of L=3 full spatial diversity space-time block codes in accordance with the teachings of the present invention. This construction method extends to an arbitrary number L of transmit antennas by selecting a set of L linearly independent elements in $GF(2^L)$.

3 THEORY OF QPSK SPACE-TIME CODES

Due to the binary rank criterion developed for QPSK codes, the rich theory developed in section 2 for BPSK-modulated space-time codes largely carries over to QPSK modulation. Space-time codes for BPSK modulation are of fundamental importance in the theory of space-time codes for QPSK modulation.

3.1 $\mathbb{Z}_4$ Stacking Constructions

The binary indicant projections allow the fundamental stacking construction for BPSK-modulated space-time codes to be "lifted" to the domain of QPSK-modulated space-time codes.

Theorem 26 Let $M_1, M_2, \ldots, M_L$ be $\mathbb{Z}_4$-valued m×n matrices of standard row type $1^l 2^{m-l}$ having the property that $$\forall a_1, a_2, \ldots, a_L \in \mathbb{F}:$$

$a_1 \Xi(M_1) \oplus a_2 \Xi(M_2) \oplus \ldots \oplus a_L \Xi(M_L)$ is nonsingular unless $a_1=a_2=\ldots a_L=0$.

Let $\mathcal{C}$ be the L×n space-time code of size $M=2^{l+m}$ consisting of all matrices $$c(\bar{x}, \bar{y}) = \begin{bmatrix} (\bar{x}\ \bar{y})M_1 \\ (\bar{x}\ \bar{y})M_2 \\ \vdots \\ (\bar{x}\ \bar{y})M_L \end{bmatrix},$$

where $(\bar{x}\bar{y})$ denotes an arbitrary indexing vector of information symbols $\bar{x} \in \mathbb{Z}_4^l$ and $\bar{y} \in \mathbb{F}^{m-l}$. Then, for QPSK transmission, $\mathcal{C}$ satisfies the QPSK binary rank criterion and achieves full spatial diversity L.

Proof: Suppose that for some $\bar{x}_0, \bar{y}_0$, not both zero, the code word $c(\bar{x}_0, \bar{y}_0)$ has $\Xi$-projection not of full rank over $\mathbb{F}$. It must be shown that the matrices $M_i$ do not have the stated nonsingularity property.

Case(i): $\beta(\bar{x}_0) \neq 0$.

If there are rows of c that are multiples of two, the failure of the $M_i$ to satisfy the nonsingularity property is easily seen. In this case, there is some row l of c for which $$0 = \beta((\bar{x}_0 \bar{y}_0) M_l) = (\beta(\bar{x}_o) \bar{0}) \Xi(M_l).$$

Hence, $\Xi(M_l)$ is singular, establishing the desired result.

Therefore, c is assumed to have no rows that are multiples of two, so that $\Xi(c) = \beta(c)$. Then there exist $a_1, a_2, \ldots, a_L \in \mathbb{F}$, not all zero, such that $$0 = a_1 \beta(\bar{x}_0 M_1) \oplus a_2 \beta(\bar{x}_0 M_2) \oplus \ldots \oplus a_L \beta(\bar{x}_0 M_L)$$
$$= \beta(\bar{x}_0)(a_1 \Xi(M_1) \oplus a_2 \Xi(M_2) \oplus \ldots \oplus a_L \Xi(M_L)).$$

Since $\beta(\bar{x}_0) \neq 0$, $a_1 \Xi(M_1) \oplus a_2 \Xi(M_2) \oplus \ldots \oplus a_L \Xi(M_L)$ is singular, as was to be shown.

Case (ii): $\beta(\bar{x}_0)=0$.

In this case, all of the rows of c are multiples of two. Letting $$c = \begin{bmatrix} (2\bar{x}_0'\ \bar{y}_0) M_1 \\ (2\bar{x}_0'\ \bar{y}_0) M_2 \\ \vdots \\ (2\bar{x}_0'\ \bar{y}_0) M_L \end{bmatrix},$$

where $\bar{x}'_0 \in \mathbb{F}^l$, then $$\Xi(c) = \begin{bmatrix} (\bar{x}_0'\ \bar{y}_0) \Xi(M_1) \\ (\bar{x}_0'\ \bar{y}_0) \Xi(M_2) \\ \vdots \\ (\bar{x}_0'\ \bar{y}_0) \Xi(M_L) \end{bmatrix}.$$

By hypothesis, there exist $a_1, a_2, \ldots, a_L \in \mathbb{F}$, not all zero, such that $$a_1 \cdot (\bar{x}_0' \bar{y}_0) \Xi(M_1) \oplus a_2 \cdot (\bar{x}_0' \bar{y}_0) \Xi(M_2) \oplus \ldots \oplus a_L \cdot (\bar{x}_0' \bar{y}_0) \Xi(M_L) = 0.$$

Then $a_1 \Xi(M_1) \oplus a_2 \Xi(M_2) \oplus \ldots \oplus a_L \Xi(M_L)$ is singular as was to be shown.

In summary, the stacking of $\mathbb{Z}_4$-valued matrices produces a QPSK-modulated space-time code achieving full spatial diversity if the stacking of their $\Xi$-projections produces a BPSK-modulated space-time code achieving full diversity. Thus, the binary constructions lift in a natural way. Analogs of the transmit delay diversity construction, rate 1/L convolutional code construction, $|\mathcal{A}|\mathcal{A} \oplus \mathcal{B}|$ construction, and multi-stacking construction all follow as immediate consequences of the QPSK stacking construction and the corresponding results for BPSK-modulated space-time codes.

Theorem 27 Let $\mathcal{C}$ be the $\mathbb{Z}_4$-valued, L×(n+L-1) space-time code produced by applying the stacking construction to the matrices $$M_1 = [G\ 0_{k \times (L-1)}], M_2 = [0_{k \times 1}\ G\ 0_{k \times (L-2)}], \ldots, M_L = [0_{k \times (L-1)}\ G],$$

where $0_{i \times j}$ denotes the all-zero matrix consisting of i rows and j columns and G is the generator matrix of a linear $\mathbb{Z}_4$-valued code of length n. If $\Xi(G)$ is of full rank over $\mathbb{F}$, then the QPSK-modulated code $\mathcal{C}$ achieves full spatial diversity L.

Theorem 28 The natural space-time code $\mathcal{C}$ associated with the rate 1/L convolutional code C over $\mathbb{Z}_4$ achieves full spatial diversity L for QPSK transmission if the transfer function matrix G(D) of C has $\Xi$-projection of full rank L as a matrix of coefficients over $\mathbb{F}$.

Theorem 29 The $\mathbb{Z}_4$-valued space-time codes $\mathcal{C}_1 = |\mathcal{A}|\mathcal{B}|$ and $\mathcal{C}_2 = |\mathcal{A}|\mathcal{A} \oplus \mathcal{B}|$ satisfy the QPSK binary rank criterion if and only if the $\mathbb{Z}_4$-valued space-time codes $\mathcal{A}$ and $\mathcal{B}$ do.

Theorem 30 Let $\mathcal{C}$ be the L×n space-time code of size $M = 2^{u+m}$ consisting of the code word matrices $$c = \begin{bmatrix} (\bar{x}\ \bar{y})M_1 \\ (\bar{x}\ \bar{y})M_2 \\ \vdots \\ (\bar{x}\ \bar{y})M_L \end{bmatrix},$$

where $\bar{x} \in \mathbb{Z}_4^u$, $\bar{y} \in \mathbb{F}^{m-u}$, and the $\mathbb{Z}_4$-valued $M_1, M_2, \ldots, M_L$ of standard row type $1^u 2^{m-u}$ satisfy the stacking construction constraints for QPSK-modulated codes. For $i=1, 2, \ldots, m$, let $(M_{1i}, M_{2i}, \ldots, M_{li})$ be an l-tuple of distinct matrices from the set $\{M_1, M_2, \ldots, M_L\}$. Then, the space-time code $\mathcal{C}_{l,m}$ consisting of the code words $$c = \begin{bmatrix} (\bar{x}_1\ \bar{y}_1)M_{11} & (\bar{x}_2\ \bar{y}_2)M_{12} & \cdots & (\bar{x}_m\ \bar{y}_m)M_{1m} \\ (\bar{x}_1\ \bar{y}_1)M_{21} & (\bar{x}_2\ \bar{y}_2)M_{22} & \cdots & (\bar{x}_m\ \bar{y}_m)M_{2m} \\ \vdots & \vdots & \ddots & \vdots \\ (\bar{x}_1\ \bar{y}_1)M_{ll} & (\bar{x}_2\ \bar{y}_2)M_{l2} & \cdots & (\bar{x}_m\ \bar{y}_m)M_{lm} \end{bmatrix}$$

is an l×mn space-time code of size $M^m$ that achieves full diversity l. Setting $(\bar{x}_1\ \bar{y}_1) = (\bar{x}_2\ \bar{y}_2) = \ldots = (\bar{x}_m\ \bar{y}_m) = (\bar{x}\bar{y})$ produces an l×mn space-time code of size $M$ that achieves full diversity.

As a consequence of these results, for example, the binary connection polynomials of Table I can be used as one aspect of the current invention to generate linear, $\mathbb{Z}_4$-valued, rate 1/L convolutional codes whose natural space-time formatting achieves full spatial diversity L. More generally, any set of $\mathbb{Z}_4$-valued connection polynomials whose modulo 2 projections appear in the table can be used.

The transformation theorem also extends to QPSK-modulated space-time codes in a straightforward manner.

Theorem 31 Let $\mathcal{C}$ be a $\mathbb{Z}_4$-valued, L×m space-time code satisfying the QPSK binary rank criterion with respect to $\Xi$-indicants, and let M be an m×n $\mathbb{Z}_4$-valued matrix whose binary projection $\beta(M)$ is nonsingular over $\mathbb{F}$. Consider the L×n space-time code $M(\mathcal{C})$ consisting of all code word matrices $$M(c) = \begin{bmatrix} \bar{c}_1 M \\ \bar{c}_2 M \\ \vdots \\ \bar{c}_L M \end{bmatrix},$$

where $c = [\bar{c}_1\ \bar{c}_2 \ldots \bar{c}_L]^T \in \mathcal{C}$: Then, $M(\mathcal{C})$ satisfies the QPSK binary rank criterion and thus, for QPSK transmission, achieves full spatial diversity L.

Proof: Let $c, c'$ be distinct code words in $\mathcal{C}$, and let $\Delta c = c \ominus_4 c'$. Without loss of generality, $\Delta c$ is assumed to be of standard row type $1^l 2^{L-l}$. Since $\beta(M)$ is nonsingular, we have $\beta(\bar{x})\beta(M) = 0$ if and only if $\beta(\bar{x}) = 0$. Hence, $M(\Delta c)$ is also of standard row type $1^l 2^{L-l}$. It is to be shown that $\Xi(M(\Delta c))$ is of rank L.

Note that $$\Xi(M(\Delta c)) = \begin{bmatrix} \beta(\Delta \bar{c}'_1)\beta(M) \\ \vdots \\ \beta(\Delta \bar{c}'_l)\beta(M) \\ \beta(\Delta \bar{c}'_{l+1})\beta(M) \\ \vdots \\ \beta(\Delta \bar{c}'_L)\beta(M) \end{bmatrix},$$

where $\Delta \bar{c}_i = 2\Delta \bar{c}'_i$ for $i > 1$. Suppose there are coefficients $a_1, a_2, \ldots, a_L \in \mathbb{F}$ such that $$0 = a_1 \cdot \beta(\Delta\bar{c}_1)\beta(M) \oplus \ldots \oplus a_l \cdot \beta(\Delta\bar{c}_l)\beta(M) \oplus a_{l+1} \cdot \beta(\Delta\bar{c}'_{l+1})\beta(M) \oplus$$
$$\ldots \oplus a_L \cdot \beta(\Delta\bar{c}'_L)\beta(M)$$
$$= [a_1\beta(\Delta\bar{c}_1) \oplus \ldots \oplus a_l\beta(\Delta\bar{c}_l) \oplus a_{l+1}\beta(\Delta\bar{c}'_{l+1}) \oplus$$
$$\ldots \oplus a_L\beta(\Delta\bar{c}'_L)]\beta(M).$$

Then, since $\beta(M)$ is nonsingular, $$a_1\beta(\Delta\bar{c}_1) \oplus \ldots \oplus a_l\beta(\Delta\bar{c}_l) \oplus a_{l+1}\beta(\Delta\bar{c}'_{l+1}) \oplus \ldots \oplus a_L\beta(\Delta\bar{c}'_L) = 0.$$

But, by hypothesis, $\Xi(\Delta c)$ is of full rank. Hence, $a_1 = a_2 = \ldots = a_L = 0$, and therefore $\Xi(M(\Delta c))$ is also of full rank L as required.

As in the binary case, the transformation theorem implies that certain concatenated coding schemes preserve the full spatial diversity of a space-time code. Finally, the results in Section 2.4 regarding the special cases of L=2 and 3 for BPSK codes also lift to full diversity space-time codes for QPSK modulation.

3.2 Dyadic Construction

Two BPSK space-time codes can be directly combined as in a dyadic expansion to produce a $\mathbb{Z}_4$-valued space-time code for QPSK modulation. If the component codes satisfy the BPSK binary rank criterion, the composite code will satisfy the QPSK binary rank criterion. Such codes are also of interest because they admit low complexity multistage decoders based on the underlying binary codes.

Theorem 32 Let $\mathcal{A}$ and be binary L×n space-time codes satisfying the BPSK binary rank criterion. Then the $\mathbb{Z}_4$-valued space-time code $\mathcal{C} = \mathcal{A} + 2\mathcal{B}$ is an L×n space-time code that satisfies the QPSK binary rank criterion and thus, for QPSK modulation, achieves full spatial diversity L.

Proof: Let $z_1 = a_1 + 2b_1$ and $z_2 = a_2 + 2b_2$ be code words in $\mathcal{C}$, with $a_1, a_2 \in \mathcal{A}$ and $b_1, b_2 \in \mathcal{B}$. Then the $\mathbb{Z}_4$ difference between the two code words is $$\Delta z = \Delta a + 2\nabla a + 2\Delta b,$$

where $\Delta a = a_1 \oplus a_2$, $\Delta b = b_1 \oplus b_2$, and $\nabla a = (1 \oplus a_1) \odot a_2$. In the latter expression, 1 denotes the all-one matrix and $\lfloor$ denotes componentwise multiplication. The modulo 2 projection is $\beta(\Delta z) = \Delta a$, which is nonsingular and equal to $\Xi(\Delta z)$ unless $\Delta a = 0$. In the latter case, $\Delta a = 0$, so that $\Delta z = 2\Delta b$. Then $\Xi(\Delta z) = \Delta b$, which is nonsingular unless $\Delta b = 0$.

3.3 Mapping Codes to Space-time Codes

Let C be a linear code of length n over $\mathbb{Z}_4$. For any code word $\bar{c}$, let $w_i(\bar{c})$ denote the number of times the symbol $i \in \mathbb{Z}_4$ appears in $\bar{c}$. Furthermore, let $w_i(C)$ denote the maximum number of times the symbol $i \in \mathbb{Z}_4$ appears in any non-zero code word of C.

The following theorem is a straightforward generalization of the ($d_{min}$, $d_{max}$) upper bound on achievable spatial diversity for BPSK-modulated codes.

Theorem 33 Let C be a linear code of length n over $\mathbb{Z}_4$. Then, for any QPSK transmission format, the corresponding space-time code $\mathcal{C}$ achieves spatial diversity at most $$L \leq \min\{n-w_0(C), n-\max\{w_1(C), w_2(C), w_{-1}(C)\}+1\}.$$

Proof: The same argument applies as in the BPSK case.

It is also worth pointing out that the spatial diversity achievable by a space-time code $\mathcal{C}$ is at most the spatial diversity achievable by any of its subcodes. For a linear $\mathbb{Z}_4$-valued code C, the code 2C is a subcode whose minimum and maximum Hamming weights among non-zero code words are given by $$d_{\min}(2C) = \min_{\bar{c} \in C}\{w_1(\bar{c}) + w_{-1}(\bar{c})\},$$

$$d_{\max}(2C) = \max_{\bar{c} \in C}\{w_1(\bar{c}) + w_{-1}(\bar{c})\}.$$

Thus, the following result is produced.

Proposition 34 Let C be a linear code of length n over $\mathbb{Z}_4$. Then, for any QPSK transmission format, the corresponding space-time code $\mathcal{C}$ achieves spatial diversity at most $$L \leq \min\{d_{min}(2C), n-d_{max}(2C)+1\}.$$

4 ANALYSIS OF EXISTING SPACE-TIME CODES

4.1 TSC Space-time Trellis Codes

Investigation of the baseband rank and product distance criteria for a variety of channel conditions is known, as well as a small number of handcrafted codes for low levels of spatial diversity to illustrate the utility of space-time coding ideas. This investigation, however, has not presented any general space-time code designs or design rules of wide applicability.

For L=2 transmit antennas, four handcrafted $\mathbb{Z}_4$ space-time trellis codes, containing 4, 8, 16, and 32 states respectively, are known which achieve full spatial diversity. The 4-state code satisfies simple known design rules regarding diverging and merging trellis branches, and therefore is of full rank, but other codes do not. These other codes require a more involved analysis exploiting geometric uniformity in order to confirm that full spatial diversity is achieved. The binary rank criterion for QPSK-modulated space-time codes of the present invention, however, allows this determination to be done in a straightforward manner. In fact, the binary analysis shows that all of the handcrafted codes employ a simple common device to ensure that full spatial diversity is achieved.

Convolutional encoder block diagrams for $\mathcal{C}_4$ codes of are shown in FIG. 5. The 4-state and 8-state codes are both linear over $\mathbb{Z}_4$, with transfer function matrices $G_4(D)=[D\ 1]$ and $G_8(D)=[D+2D^2\ 1+2D^2]$, respectively. By inspection, both satisfy the QPSK binary rank criterion of the present invention and therefore achieve L=2 spatial diversity.

The 16-state and 32-state codes are nonlinear over $\mathbb{Z}_4$. In this case, the binary rank criterion of the present invention is applied to all differences between code words. For the 16-state code, the code word matrices are of the following form:

$$c = \begin{bmatrix} x_1(D) \\ x_2(D) \end{bmatrix} = \begin{bmatrix} D+2D^2 & 0 \\ 1+2D & 2D^2 \end{bmatrix} \begin{bmatrix} z(D) \\ \alpha(z(D)) \end{bmatrix}.$$

For the 32-state code, the code words are given by $$c = \begin{bmatrix} x_1(D) \\ x_2(D) \end{bmatrix} = \begin{bmatrix} D+2D^2+2D^3 & 3D^2 \\ 1+D+2D^3 & 3D^2 \end{bmatrix} \begin{bmatrix} z(D) \\ \alpha(z(D)) \end{bmatrix}.$$

Due to the initial delay structure (enclosed by dashed box in FIG. 5) that is common to all four code designs, the first unit input $z_i=\pm 1$—or first nonzero input $z_i=2$ if $z(D)$ consists only of multiples of 2—results in two consecutive columns that are multiples of $[0\ 1]^T$ and $[1\ x\ ]^T$, where $x \in \mathbb{Z}_4$ is arbitrary. The only exception occurs in the case of the 32-state code when the first $\pm 1$ is immediately preceded by a 2. In this case, the last nonzero entry results in a column that is a multiple of $[1\pm 1]^T$. Hence, the $\Psi$-projection of the code word differences is always of full rank. By the QPSK binary rank criterion of the present invention, all four codes achieve full L=2 spatial diversity.

For L=4 transmit antennas, the full-diversity space-time code corresponding to the linear $\mathbb{Z}_4$-valued convolutional code with transfer function $G(D)=[1\ D\ D^2\ D^3\ ]$ is known as a simple form of repetition delay diversity. As noted in Theorem 13, this design readily generalizes to spatial diversity levels L>4 in accordance with the general design criteria of the present invention. The stacking and related constructions discussed above, however, provide more general full-diversity space-time codes for $L \geq 2$.

4.2 GFK Space-time Trellis Codes

For all $L \geq 2$, it is known that trellis-coded delay diversity schemes achieve full spatial diversity with the fewest possible number of trellis states. As a generalization of the TSC simple design rules for L=2 diversity, the concept of zeroes symmetry to guarantee full spatial diversity for $L \geq 2$ is known.

A computer search has been undertaken to identify space-time trellis codes of full diversity and good coding advantage. A table of best known codes for BPSK modulation is available which covers the cases of L=2, 3, and 5 antennas. For QPSK codes, the table covers only L=2. The 4-state and 8-state QPSK codes provide 1.5 dB and 0.62 dB additional coding advantage, respectively, compared to the corresponding TSC trellis codes.

All of the BPSK codes satisfy the zeroes symmetry criterion. Since zeroes symmetry for BPSK codes is a very special case of satisfying the binary rank criterion of the present invention, all of the BPSK codes are special cases of the more general stacking construction of the present invention.

The known QPSK space-time codes are different. Some of the QPSK codes satisfy the zeroes symmetry criterion; some do not. Except for the trivial delay diversity code (constraint length v=2 with zeroes symmetry), all of them are nonlinear codes over $\mathbb{Z}_4$ that do not fall under any of our general constructions.

The QPSK code of constraint length v=2 without zeroes symmetry consists of the code words c satisfying $$c(D)^T = (a(D)\ b(D)) \begin{bmatrix} 1 & 2D \\ 2D & 1+2D \end{bmatrix},$$

where $a(D)$ and $b(D)$ are binary information sequences and for simplicity + is used instead of $\oplus_4$ to denote modulo 4 addition. The $\mathbb{Z}_4$-difference between two code words $c_1$ and $c_2$, corresponding to input sequences $(a_1(D)\ b_1(D))$ and $(a_2(D)\ b_2(D))$, is given by $$\Delta c = \begin{bmatrix} \Delta a(D) + 2\nabla a(D) + 2D\Delta b(D) \\ 2D\Delta a(D) + \Delta b(D) + 2\nabla b(D) + 2D\Delta b(D) \end{bmatrix},$$

where $\Delta a(D) = a_1(D) \oplus a_2(D)$, $\nabla a(D) = (1 \oplus a_1(D)) \odot a_2(D)$, and so forth. Here $\odot$ denotes componentwise multiplication (coefficient by coefficient).

Note that the $\mathbb{Z}_4$-difference $\Delta c$ is not a function of the binary differences $\Delta a(D)$ and $\Delta b(D)$ alone but depends on the individual input sequences $a(D)$ and $b(D)$ through the terms $\nabla a(D)$ and $\nabla b(D)$. If $\Delta a(D) = a_0 + a_1 D + a_2 D^2 + \ldots + a_N D^N$, $(a_i \in \mathbb{F})$, then $$\Delta a(D) + 2\nabla a(D) = \pm a_0 \pm a_1 D \pm a_2 D^2 \pm \ldots \pm a_N D^N,$$

for some suitable choice of sign at each coefficient.

Projecting the code word difference $\Delta c$ modulo 2 gives $$\beta(\Delta c) = \begin{bmatrix} \Delta a(D) \\ \Delta b(D) \end{bmatrix},$$

which is nonsingular unless either (i) $\Delta a(D)=0$, $\Delta b(D) \neq 0$; (ii) $\Delta b(D)=0$, $\Delta a(D) \neq 0$; or (iii) $\Delta a(D) = \Delta b(D) \neq 0$. For case (i), one finds that $$\Xi(\Delta c) = \Delta b(D) \begin{bmatrix} D \\ 1 \end{bmatrix},$$

which is nonsingular. For case (ii), $$\Xi(\Delta c) = \Delta b(D) \begin{bmatrix} 1 \\ D \end{bmatrix},$$

which is also nonsingular. Finally, in case (iii), $$\Delta c = \begin{bmatrix} \Delta a(D) + 2\nabla a(D) + 2D\Delta a(D) \\ \Delta a(D) + 2\nabla a(D) \end{bmatrix}. \quad (11)$$

Thus, the t-th column of $\Delta c$ is given by $$\bar{h}_t = \begin{bmatrix} \Delta a_t + 2\nabla a_t + 2\Delta a_{t-1} \\ \Delta a_t + 2\nabla a_t \end{bmatrix}.$$

Consider the first k for which $\Delta a_k = 1$ and $\Delta a_{k+1} = 0$ (guaranteed to exist since the trellis is terminated). Then the k-th and (k+1)-th columns of $\Delta c$ are $\bar{h}_k = [\pm 1 \ \pm 1]^T$ and $\bar{h}_{k+1} = [2\ 0]^T$, respectively. Thus, $\Psi(\Delta c)$ is nonsingular, and the QPSK binary rank criterion is satisfied. Note that it is the extra delay term in the upper expression of equation (11) that serves to guarantee full spatial diversity.

The QPSK code of constraint length $v=3$ with zeroes symmetry consists of the code words c satisfying $$c(D)^T = (a(D)\ b(D)) \begin{bmatrix} 1+3D & D+D^2 \\ 2 & 2D \end{bmatrix}.$$

For this code, the binary rank analysis is even simpler. The projection modulo 2 of the $\mathbb{Z}_4$ difference $\Delta c$ between two code words is given by $$\beta(\Delta c(D)) = \Delta a(D) \begin{bmatrix} 1 \oplus D \\ D \oplus D^2 \end{bmatrix},$$

which is nonsingular unless $\Delta a(D)=0$ and $\Delta b(D) \neq 0$. In the latter case, $$\Delta c = \Delta b(D) \begin{bmatrix} 2 \\ 2D \end{bmatrix},$$

whose $\Xi$- and $\Psi$-indicants are nonsingular.

The QPSK code of constraint length $v=3$ without zeroes symmetry, consisting of the code words $$c(D)^T = (a(D)b(D)) \begin{bmatrix} 1+2D^2 & D+2D^2 \\ 1+2D & 2 \end{bmatrix},$$

does not satisfy the QPSK<binary rank criterion. When $\Delta a(D)=0$ but $\Delta b(D) \neq 0$, the code word difference is $$\Delta c = \begin{bmatrix} \Delta b(D) + 2\nabla b(D) + 2D\Delta b(D) \\ 2\Delta b(D) \end{bmatrix},$$

for which $\Xi(\Delta c)$ and $\Psi(\Delta c)$ are both singular. The latter can be easily discerned from the fact that the second row of $\Delta c$ is two times the first row.

4.3 BBH Space-time Trellis Codes

Another computer search is known for L=2 QPSK trellis codes with 4, 8, and 16 states which is similar to the one discussed above. The results of the two computer searches agree regarding the optimal product distances; but, interestingly, the codes found by each have different generators. This indicates that, at least for L=2 spatial diversity, there is a multiplicity of optimal codes.

All of the BBH codes are non-linear over $\mathbb{Z}_4$. The 4-state and 16-state codes consist of the following code word matrices:

$$4\text{-state}: c(D)^T = (a(D)b(D)) \begin{bmatrix} 2+D & -D \\ 2 & 2+D \end{bmatrix}$$

$$16\text{-state}: c(D)^T = (a(D)b(D)) \begin{bmatrix} 1+2D & 2+D+2D^2 \\ 2+2D^2 & 2D \end{bmatrix}.$$

The analysis showing that these two codes satisfy the QPSK binary rank criterion is straight-forward and similar to that given for the GFK codes.

The 8-state BBH code consists of the code word matrices $$c(D)^T = (a(t)b(t)) \begin{bmatrix} D & 1 \\ 2+2D+2D^2 & 2+2D \end{bmatrix},$$

which expression can be rearranged to give $$c(D) = a(D) \begin{bmatrix} D \\ 1 \end{bmatrix} + 2b(D) \begin{bmatrix} 1+D+D^2 \\ 1+D^2 \end{bmatrix}.$$

Whereas the GFK 8-state code does not satisfy the QPSK binary rank criterion, the BBH 8-state code does and is in fact an example of our dyadic construction $\mathcal{C}=\mathcal{A}+2\mathcal{B}$. By inspection, the two binary component space-time codes $\mathcal{A}$ and $\mathcal{B}$, with transfer functions $$G_A(D) = \begin{bmatrix} D \\ 1 \end{bmatrix} \quad G_B(D) = \begin{bmatrix} 1 \oplus D \oplus D^2 \\ 1 \oplus D^2 \end{bmatrix},$$

respectively, both satisfy the BPSK binary rank criterion.

These results show that the class of space-time codes satisfying the binary rank criteria is indeed rich and includes, for every case searched thus far, optimal codes with respect to coding advantage.

4.4 Space-time Block Codes From Orthogonal Designs

Known orthogonal designs can give rise to nonlinear space-time codes of very short block length provided the PSK modulation format is chosen so that the constellation is closed under complex conjugation.

Consider the known design in which the modulated code words are of the form $$\begin{bmatrix} x_1 & x_2^* \\ x_2 & -x_1^* \end{bmatrix},$$

where $x_1$, $x_2$ are BPSK constellation points. Assuming the on-axis BPSK constellation, the corresponding space-time block code $\mathcal{C}$ consists of all binary matrices of the form $$c = \begin{bmatrix} a & b \\ b & 1 \oplus a \end{bmatrix}.$$

This simple code provides L=2 diversity gain but no coding gain. The difference between two modulated code words has determinant $$\det \begin{vmatrix} (-1)^{a_1} - (-1)^{a_2} & (-1)^{b_1} - (-1)^{b_2} \\ (-1)^{b_1} - (-1)^{b_2} & -[(-1)^{a_1} - (-1)^{a_2}] \end{vmatrix} = -([(-1)^{a_1} - (-1)^{a_2}]^2 + [(-1)^{b_1} - (-1)^{b_2}]^2),$$

which is zero if and only if the two code words are identical ($a_1=a_2$ and $b_1=b_2$). On the other hand, the corresponding binary difference of the unmodulated code words is given by $$\Delta c = \begin{bmatrix} a_1 \oplus a_2 & b_1 \oplus b_2 \\ b_1 \oplus b_2 & a_1 \oplus a_2 \end{bmatrix}.$$

But, if $a_1 \oplus a_2 = b_1 \oplus b_2 = 1$, for example, the difference is $$\Delta c = \begin{bmatrix} 1 & 1 \\ 1 & 1 \end{bmatrix},$$

a matrix that is singular over $\mathbb{F}$. Hence, $\mathcal{C}$ achieves full spatial diversity but does not satisfy the BPSK binary rank criterion.

EXTENSIONS TO NON-QUASI-STATIC FADING CHANNELS

For the fast fading channel, the baseband model differs from equation (1) discussed in the background in that the complex path gains now vary independently from symbol to symbol:

$$y_t^j = \sum_{i=1}^n \alpha_{ij}(t) s_t^i \sqrt{E}_s + n_t^j. \quad (12)$$

Let code word c be transmitted. In this case, the pairwise error probability that the decoder will prefer the alternate code word e to c can be upper bounded by $$P(c \to e \mid \{\alpha_{ij}(t)\}) \leq \left( \frac{1}{\prod_{t=1}^n (1 + |f(\bar{c}_t) - f(\bar{e}_t)|^2 E_s / 4N_0)} \right)^{L_r}$$

$$\leq \left( \frac{\mu E_s}{4N_0} \right)^{-dL_r},$$

where $\bar{c}_t$ is the t-th column of c, $\bar{e}_t$ is the t-th column of e, d is the number of columns $\bar{c}_t$ that are different from $\bar{e}_t$, and $$\mu = \left( \prod_{\bar{c}_t \neq \bar{e}_t} |f(\bar{c}_t) - f(\bar{e}_t)|^2 \right)^{1/d}.$$

The diversity advantage is now $dL_r$, and the coding advantage is $\mu$.

Thus, the design criteria for space-time codes over fast fading channels are the following:

(1) Distance Criterion: Maximize the number of column differences $d=|\{t:\bar{c}_t \neq \bar{e}_t\}|$ over all pairs of distinct code words c, e $\in \mathcal{C}$, and (2) Product Criterion: Maximize the coding advantage $$\mu = \left( \prod_{\bar{c}_t \neq \bar{e}_t} |f(\bar{c}_t) - f(\bar{e}_t)|^2 \right)^{1/d}.$$

over all pairs of distinct code words c, e $\in \mathcal{C}$.

Since real fading channels are neither quasi-static nor fast fading but something in between, designing space-time codes based on a combination of the quasi-static and fast fading design criteria is useful. Space-time codes designed according to the hybrid criteria are hereafter referred to as "smart greedy codes," meaning that the codes seek to exploit both spatial and temporal diversity whenever available.

A handcrafted example of a two-state smart-greedy space-time trellis code for L=2 antennas and BPSK modulation is known. This code is a special case of the multi-stacking construction of the present invention applied to the two binary rate ½ convolutional codes having respective transfer function matrices $$G_1(D) = \begin{bmatrix} 1 \oplus D \\ D \end{bmatrix}, \quad G_2(D) = \begin{bmatrix} 1 \\ 1 \oplus D \end{bmatrix}.$$

The known M-TCM example can also be analyzed using the binary rank criteria. Other smart-greedy examples are based on traditional concatenated coding schemes with space-time trellis codes as inner codes.

The general $|\mathcal{A}|\mathcal{B}|, |\mathcal{A}|\mathcal{A} \oplus \mathcal{B}|$, de-stacking, multi-stacking, and concatenated code constructions of the present invention provide a large class of space-time codes that are "smart-greedy." Furthermore, the common practice in wireless communications of interleaving within code words to randomize burst errors on such channels is a special case of the transformation theorem. Specific examples of new, more sophisticated smart-greedy codes can be easily obtained, for example, by de-stacking or multi-stacking the space-time trellis codes of Table I. These latter designs make possible the design of space-time overlays for existing wireless communication systems whose forward error correction schemes are based on standard convolutional codes. The extra diversity of the spatial overlay would then serve to augment the protection provided by the traditional temporal coding.

6 EXTENSIONS TO HIGHER ORDER CONSTELLATIONS

Direct extension of the binary rank analysis in accordance with the present invention to general L×n space-time codes over the alphabet $\mathbb{Z}_{2^r}$ for $2^r$-PSK modulation with $r \geq 3$ is difficult. Special cases such as 8-PSK codes with L=2, however, are tractable. Thus, known 8PSK-modulated space-time codes are covered by the binary rank criteria of the present invention.

For general constellations, multi-level coding techniques can produce powerful space-time codes for high bit rate applications while admitting a simpler multi-level decoder. Multi-level PSK constructions are possible using methods of the present invention. Since at each level binary decisions are made, the binary rank criteria can be used in accordance with the present invention to design space-time codes that provide guaranteed levels of diversity at each bit decision.

To summarize, general design criteria for PSK-modulated space-time codes have been developed in accordance with the present invention, based on the binary rank of the unmodulated code words, to ensure that full spatial diversity is achieved. For BPSK modulation, the binary rank criterion provides a complete characterization of space-time codes achieving full spatial diversity when no knowledge is available regarding the distribution of ±signs among the baseband differences. For QPSK modulation, the binary rank criterion is also broadly applicable. The binary design criteria significantly simplify the problem of designing space-time codes to achieve full spatial diversity. Much of what is currently known about PSK-modulated space-time codes is covered by the design criteria of the present invention. Finally, several new construction methods of the present invention are provided that are general. Powerful exemplary codes for both quasi-static and time-varying fading channels have been identified based on the construction of the current invention and the exemplary set of convolutional codes of Table I.

What is claimed is:

1. A communication system comprising:
   a channel encoder for encoding information symbols with an error control code for producing code word symbols;
   a spatial formatter for parsing the produced code word symbols to allocate the symbols to a presentation order among a plurality of antenna links; and
   a phase shift keying modulator for mapping the parsed code word symbols onto constellation points from a discrete complex-valued signaling constellation according to binary projections to achieve spatial diversity,
   wherein said channel encoder comprises a mobile channel encoder producing the code word symbols having length of a multiple N of the number of said plurality of antenna links L.

2. A communication system as recited in claim 1 comprising:
   a framer for segmenting transmit data blocks into fixed frame lengths for generating information symbols from a discrete alphabet of symbols; and
   data terminal equipment (DTE) coupled to said framer for communicating digital cellular data blocks.

3. A communication system as recited in claim 2 wherein said digital cellular data terminal equipment comprises Code Division Multiple Access (CDMA) systems.

4. A communication system as recited in claim 2 wherein said digital cellular data terminal equipment comprises Time Division Multiple Access (TDMA) systems.

5. A communication system as recited in claim 1, wherein said spatial formatter parses the length N of the produced code word symbols among L of the transmit antennas.

6. A communication system comprising:
   a channel encoder for encoding information symbols with an error control code for producing code word symbols;
   a spatial formatter for parsing the produced code word symbols to allocate the symbols to a presentation order among a plurality of antenna links; and
   a phase shift keying modulator for mapping the parsed code word symbols onto constellation points from a discrete complex-valued signaling constellation according to binary projections to achieve spatial diversity,
   wherein the channel encoder and the spatial formatter utilize a class of space-time codes satisfying a binary rank criteria.

7. A communication system comprising:
   a channel encoder for encoding information symbols with an error control code for producing code word symbols;
   a spatial formatter for parsing the produced code word symbols to allocate the symbols to a presentation order among a plurality of antenna links; and
   a phase shift keying modulator for mapping the parsed code word symbols onto constellation points from a discrete complex-valued signaling constellation according to binary projections to achieve spatial diversity,
   wherein the combination of channel encoder and spatial formatter are provided with a stacking space-time code construction.

8. A communication system as recited in claim 1, wherein binary phase shift keying (BPSK) modulation is used and a space-time code is based on formatting the output of convolutional channel encoder for presentation across a plurality of transmit antennas.

9. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein a concatenated space-time code is used in which the outer code is used to satisfy a binary rank criteria and multiple inner codes are used to encode the transmitted information from a plurality of transmit antennas.

10. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein a concatenated space-time code is used in which the inner code is composed of a channel encoder and a spatial formatter designed to satisfy a binary rank criteria.

11. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein the combination of channel encoder and spatial formatter are covered by a multi-stacking construction.

12. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein quadrature phase shift keying (QPSK) modulation is used and a space-time code is covered by a stacking, multi-stacking, or de-stacking constructions for QPSK.

13. A communication system as recited in claim 1, wherein QPSK modulation is used and a space-time code is based on formatting an output of a linear convolutional code over the ring of integers modulo 4 for presentation across a plurality of transmit antennas.

14. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein QPSK modulation is used and a space-time code employs a dyadic construction.

15. A communication system comprising:
a channel encoder for encoding information symbols with an error control code for producing code word symbols,
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein multi-level coded modulation and multi-stage decoding are used and a binary space-time code employed in each level belongs to the class of codes that satisfy the binary rank criterion or any of the constructions.

16. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein M-ary PSK modulation, M=8 or more, is used and a space-time code belongs to a class satisfying the binary rank criteria.

17. A communication system comprising:
a channel encoder for encoding information symbols with an error control code for producing code word symbols;
a spatial formatter for parsing the produced code word symbols to allocate the symbols to a presentation order among a plurality of antenna links; and
a phase shift keying modulator for mapping the parsed code word symbols onto constellation points from a discrete complex-valued signaling constellation according to binary projections to achieve spatial diversity,
wherein graphical space-time codes are designed such that the code generating matrix satisfies the stacking, multi-stacking, or de-stacking construction.

18. A communications method comprising:
encoding information symbols with an underlying error control code to produce code word symbols;
parsing the produced code word symbols to allocate the symbols in a presentation order to a plurality of antenna links, wherein the code word symbols have length of a multiple N of the number of said plurality of antenna links L; and mapping the parsed code word symbols onto constellation points from a discrete complex-valued signaling constellation, wherein the symbols are modulated for transmission over a plurality of transmit antennas corresponding to the antenna links.

19. A method as recited in claim 18 wherein said encoding and parsing steps are performed with a space-time encoder having a channel encoder and a space-time formatter.

20. A communications system comprising:

means for encoding the generated information symbols with an underlying error control code to produce code word symbols;

means for parsing the produced code word symbols to allocate the symbols in a presentation order to a plurality of antenna links, wherein the code word symbols have length of a multiple N of the number of said plurality of antenna links L; and means for mapping the parsed code word symbols onto constellation points from a discrete complex-valued signaling constellation, wherein the symbols are modulated for transmission over a plurality of transmit antennas corresponding to the antenna links.

21. A communication system as recited in claim a 20 wherein said parsing means comprises a spatial formatter for parsing the length N of the produced code word symbols among the L antennas.

22. A communication system as recited in claim 20 wherein said encoding and parsing means comprise a space-time encoder having a channel encoder and a space-time formatter.

* * * * *